(12) United States Patent
Hogg et al.

(10) Patent No.: US 6,430,412 B1
(45) Date of Patent: Aug. 6, 2002

(54) CALL HANDOFF

(75) Inventors: William E. Hogg, Warrenville; Roger E. Merel, Naperville, both of IL (US)

(73) Assignee: GTE Airfone Incorporated, Oakbrook, IL (US)

( * ) Notice: Subject to any disclaimer, the term of this patent is extended or adjusted under 35 U.S.C. 154(b) by 0 days.

(21) Appl. No.: 09/416,451

(22) Filed: Oct. 12, 1999

Related U.S. Application Data

(63) Continuation of application No. 08/509,703, filed on Jul. 31, 1995.

(51) Int. Cl.$^7$ .................................................. H04Q 7/20
(52) U.S. Cl. ........................ 455/436; 455/437; 455/442; 455/431; 455/432; 370/331
(58) Field of Search ................................. 455/436, 437, 455/438, 439, 440, 441, 442, 443, 444, 445, 403, 422, 517, 550, 516, 344, 345, 431, 432; 370/331

(56) References Cited

U.S. PATENT DOCUMENTS

| | | | |
|---|---|---|---|
| 3,663,762 A | 5/1972 | Joel, Jr. ........................ | 455/436 |
| 3,952,251 A | 4/1976 | Kahn ........................... | 455/431 |
| 4,144,412 A | 3/1979 | Ito et al. ...................... | 455/435 |
| 4,419,766 A | 12/1983 | Goeken et al. ............... | 455/431 |
| 4,797,947 A | 1/1989 | Labedz ........................ | 455/435 |
| 4,850,032 A | 7/1989 | Freeburg ..................... | 455/435 |
| 4,856,048 A | 8/1989 | Yamamoto et al. .......... | 455/435 |
| 4,870,408 A | 9/1989 | Zdunek et al. ............... | 455/435 |
| 4,926,421 A | 5/1990 | Kawano et al. .............. | 455/444 |
| 5,123,112 A | 6/1992 | Choate ......................... | 455/431 |
| 5,353,332 A | 10/1994 | Raith et al. .................. | 455/431 |
| 5,444,762 A | 8/1995 | Frey et al. .................... | 455/435 |
| 5,519,761 A | * 5/1996 | Gilhousen .................... | 455/431 |
| 5,590,177 A | 12/1996 | Vimur et al. ................. | 455/436 |

* cited by examiner

Primary Examiner—William Trost
Assistant Examiner—Keith Ferguson
(74) Attorney, Agent, or Firm—James K. Weixel

(57) ABSTRACT

A system and method for performing call handoff in a mobile communication system. The system is employed on commercial aircraft and enables calls to be transferred between different traffic service channels in order to continue and/or improve communications. In a conservation handoff scenario, user service channels are transferred between partially utilized traffic service channels resulting in unused traffic service channels that are released, thus freeing more traffic service channels for use by other aircraft. In a seizure handoff scenario, signal quality on one traffic service channel has begun to deteriorate prompting a call handoff wherein a call on the deteriorating traffic service channel is transferred to an unused user service channel on another traffic service channel already in use aboard the aircraft, thus allowing users to continue their calls. In a reservation handoff situation the aircraft equipment responds to a deterioration of signal quality and transfers all calls to another traffic service channel on a different radio base station allowing user's to continue their calls.

1 Claim, 30 Drawing Sheets

| ARAD TSC 1 | ARAD TSC 2 |
|---|---|
| SUBBAND A CHANNEL X | SUBBAND B CHANNEL Y |
| VOICE 1 USC 1 | DATA 1 USC 5 |
| FAX 1 USC 3 | VOICE 2 USC 7 |

FIG. 4A

| ARAD TSC 1 | ARAD TSC 2 |
|---|---|
| SUBBAND A CHANNEL X | SUBBAND B CHANNEL Y |
| VOICE 1 USC 1 | DATA 1 USC 5 |
| IDLE USC 3 | IDLE USC 7 |

FIG. 4B

| ARAD TSC 1 | ARAD TSC 2 |
|---|---|
| SUBBAND A CHANNEL X | SUBBAND B CHANNEL Y |
| VOICE 1 USC 1 | DATA 1 USC 5 |
| DATA 1 USC 3 | IDLE USC 7 |

FIG. 4C

| ARAD TSC 1 | ARAD TSC 2 |
|---|---|
| SUBBAND A CHANNEL X | SUBBAND B CHANNEL Y |
| VOICE 1 USC 1 | IDLE USC 5 |
| DATA 1 USC 3 | IDLE USC 7 |

FIG. 4D

| ARAD TSC 1 | ARAD TSC 2 |
|---|---|
| SUBBAND A CHANNEL X | OFF |
| VOICE 1 USC 1 | DATA 1 USC 5 |
| DATA USC 3 | IDLE USC 7 |

FIG. 4E

| ARAD TSC 1 | ARAD TSC 2 |
|---|---|
| SUBBAND A CHANNEL X | OFF |
| VOICE 1 USC 1 | IDLE USC 5 |
| VOICE 2 USC 3 | IDLE USC 7 |

FIG. 5A

| ARAD TSC 1 | ARAD TSC 2 |
|---|---|
| SUBBAND A CHANNEL X | SUBBAND B CHANNEL X |
| VOICE 1 USC 1 | IDLE USC 5 |
| VOICE 2 USC 3 | IDLE USC 7 |

FIG. 5B

| ARAD TSC 1 | ARAD TSC 2 |
|---|---|
| SUBBAND A CHANNEL X | SUBBAND B CHANNEL X |
| VOICE 1 USC 1 | VOICE 1 USC 5 |
| VOICE 2 USC 3 | VOICE 2 USC 7 |

FIG. 5C

| ARAD TSC 1 | ARAD TSC 2 |
|---|---|
| SUBBAND A CHANNEL X | SUBBAND B CHANNEL X |
| IDLE USC 1 | VOICE 1 USC 5 |
| IDLE USC 3 | VOICE 2 USC 7 |

FIG. 5D

| ARAD TSC 1 | ARAD TSC 2 |
|---|---|
| OFF | SUBBAND B CHANNEL X |
| IDLE USC 1 | VOICE 1 USC 5 |
| IDLE USC 3 | VOICE 2 USC 7 |

FIG. 5E

| ARAD TSC 1 | ARAD TSC 2 |
|---|---|
| SUBBAND A CHANNEL X | SUBBAND A CHANNEL Y |
| VOICE 1 USC 1 | VOICE 3 USC 5 |
| VOICE 2 USC 3 | DATA USC 7 |

FIG. 6A

| ARAD TSC 1 | ARAD TSC 2 |
|---|---|
| SUBBAND A CHANNEL X | SUBBAND A CHANNEL Y |
| VOICE 1 USC 1 | VOICE 3 USC 5 |
| VOICE 2 USC 3 | DATA USC 7 |

FIG. 6B

| ARAD TSC 1 | ARAD TSC 2 |
|---|---|
| OFF | SUBBAND A CHANNEL Y |
| IDLE USC 1 | VOICE 3 USC 5 |
| IDLE USC 3 | DATA USC 7 |

FIG. 6C

| ARAD TSC 1 | ARAD TSC 2 |
|---|---|
| SUBBAND B CHANNEL Z | SUBBAND A CHANNEL Y |
| IDLE USC 1 | VOICE 3 USC 5 |
| IDLE USC 3 | DATA USC 7 |

FIG. 6D

| ARAD TSC 1 | ARAD TSC 2 |
|---|---|
| SUBBAND B CHANNEL Z | SUBBAND A CHANNEL Y |
| VOICE 1 USC 1 | VOICE 3 USC 5 |
| VOICE 2 USC 3 | DATA USC 7 |

FIG. 6E

CALL HANDOFF

This application is a continuation of Ser. No. 08/509,703 filed Jul. 31, 1995.

FIELD OF THE INVENTION

The present invention relates generally to multiple communication devices sharing a limited amount of available electromagnetic spectrum. More particularly, the present invention relates to more efficient and effective usage of communication channels associated with telephonic devices employed on airplanes.

BACKGROUND OF THE INVENTION

The electromagnetic spectrum is a limited and valuable resource allocated in the United States by the federal government, specifically the Federal Communications Commission (FCC). The FCC determines which types of applications are permitted to use which parts of the electromagnetic spectrum. Two radio frequency bands have been allocated by the FCC for use by airborne telecommunication systems. Communications with airborne telephones on commercial aircraft has been allotted bands from 849 to 851 megahertz (MHz) for uplink communications, i.e. transmissions to the airborne telephones, and from 894 to 896 MHz for downlink communication, i.e., transmissions from airborne telephones. Each band has 2 megahertz (MHz) bandwidth, and the two bands are separated by 45 MHz. Both the uplink and downlink bandwidths are divided into 10 subbands, each 200 kilohertz (KHz) wide. The subbands are further divided into 29 traffic service channels (a type of communication channel) and six pilot channels each. Thus a total of 290 traffic service channels are available for communication with airborne telephones. Each traffic service channel has a 6 KHz bandwidth in both the uplink and downlink frequency allotments.

As shown in FIG. 1 the electromagnetic broadcast frequency spectrum 10 allotted for communications with airborne telephones has a low band 12 and high band 14. Each band 12,14 has been divided into 10 subbands 16,18 of 200 KHz each, numbered from 10 down to 1. Each subband 16,18 has been further divided into a set of 6 numbered control channels (pilot channels) 20 and 29 traffic service channels 22. In accordance with the FCC Memorandum of Opinion and Order, each of the six control channels 20 has been given a bandwidth of 3.2 KHz, and each of the 29 traffic service channels 22, a bandwidth of 6 KHz. Guard bands of 2.5 KHz 24, 2.3 KHz 26 and 1.5 KHz 28 separate traffic service channels 22 from pilot channels 20 and from traffic service channels in different subbands. These channel assignments allow up to six service providers to offer nationwide airborne radiotelephone services simultaneously. Each will be assigned one of the numbered pilot channels. The pilot channel assigned to a specific service provider will be the same in each subband in each cell covered by a radio base station. All service providers will have equal access to the set of traffic service channels used in each cell. No service provider "owns": a traffic service channel, but each "owns" one control channel in each subband.

Finally, it is known to divide each traffic service channel into 2 user service channels. Each user service channel carries the communications between a phone on an airplane and another phone coupled to a radio base station. That radio base station must be serving a geographic area in close enough proximity to the aircraft to allow communication with the airplane.

The United States is blanketed with dozens of radio base stations. A radio base 5 station is the suite of ground equipment required to process air-to-ground and ground-to-air calls. The ground stations are located throughout the U.S. as well as Canada and Mexico. Typically, one radio base station is separated from another by 300 to 500 miles. Each radio base station is assigned a block of frequencies or subband(s) on which calls are processed. Subbands are assigned such that the same subband is not reused within 550 miles from the radio base station it is assigned to. This arrangement avoids co-channel interference, i.e., the same channel in use in overlapping cells.

The limited bandwidth allotted to communication with airborne telephones in combination with the number of available radio base stations serves to constrain the possible number of simultaneous calls, thus limiting the market for airborne telephonic communications. Therefore it is desirable to provide a system capable of utilizing the available spectrum with as high efficiency as possible while providing excellent quality communications to airborne customers.

When an aircraft radio unit on an aircraft acquires a traffic service channel both user service channels may or may not be utilized for a period of time, but typically one user service channel becomes unused before the other. This is because each user service channel is being used independently, i.e., any given call utilizing a user service channel is usually unrelated to a call utilizing the other user service channel on the same traffic service channel. In that case the aircraft will only be using one user service channel per traffic service channel, even though two user service channels are available per traffic service channel. This often happens on multiple traffic service channels resulting in multiple traffic service channels only being partially utilized. Note that present aircraft radio units have only two traffic service channels each. Unfortunately, partial utilization of multiple traffic service channels by one aircraft will preclude other aircraft from acquiring those traffic service channels or using the unused user service channel. Recall that a total of 290 traffic service channels is all that is presently available for airborne telephones. In present airborne telephone systems the described management of Traffic service channels can result in callers on other aircraft being precluded from making calls while unused user service channels exist but are unavailable. Therefore, it would be desirable for traffic service channels to be used more efficiently to minimize the number of partially utilized traffic service channels in order to increase the number of potential simultaneous calls.

Other problems arise with a mobile communications system, especially one which is deployed on commercial jet aircraft. For example, a conversation between a passenger on such a plane and someone on the ground or in another plane may continue long enough for the plane to fly from one cell into another. Note that in this case a cell is defined as the area wherein a radio base station provides a signal above a threshold necessary to provide quality communications and that cell areas may overlap. When this happens the call is eventually terminated as an aircraft flies out of an acceptable communications range. Presently, the only way to continue the conversation is for one of the parties to the conversation to redial the other party. It would be desirable for the mobile communications system to retain the connection between callers even though at least one of the callers is moving from one cell to the next. Furthermore, it would be desirable to retain the connection between callers with a minimum amount of interference when a caller crosses from one zone to the next.

As the caller begins leaving a particular cell zone the strength of the signal from the radio base station begins to diminish. As the signal continues to diminish communication becomes difficult, then impossible with existing equipment. Another related difficulty is the degradation of signal quality for reasons other than leaving a particular cell zone. For example, interference can cause noise on the channel, making communication difficult. It would be desirable to minimize problems with a noisy or weak signal strength channel being used in a mobile communication system. Furthermore, it would be desirable to be able to minimize the above problems with present aircraft radio units having a variety of different traffic service channel usage scenarios.

SUMMARY OF THE INVENTION

Accordingly, the present invention provides an improved method and system for performing call handoff.

More specifically, one embodiment the present invention employs a digital system providing call handoff capabilities that greatly improve overall system call capacity and quality in three different handoff scenarios. In a conservation handoff scenario the present invention makes more efficient use of communication channels by combining calls on partially used traffic service channels to create both more fully utilized and unused traffic service channels. The resulting unused channels are released so that they can be acquired by other aircraft, or by the same aircraft if need be.

An example of a successful conservation handoff would begin with two traffic service channels being established between an aircraft radio unit on a plane and a radio base station on the ground. At some point only one user service channel is in use on each of the two traffic service channels. Note that each user service channel supports one call. A conservation handoff has the effect of transferring one of the calls from its user service channel on one of the traffic service channels to the unused user service channel on the other traffic service channel. The system identifies when certain criteria fully described below have been satisfied. If the criteria have been satisfied a duplicate user channel of one of the traffic service channels is established on the other traffic service channel. Control is transferred to the traffic service channel with the duplicate user service channel. The original user service channel is broken down and that traffic service channel is released. Thus after a conservation handoff has been performed with two partially used traffic service channels, there remains only one fully utilized traffic service channel with two active user service channels and one unused traffic service channel that is released, thus freeing the unused traffic service channel for use by another aircraft. The effect is a traffic packing which maximizes the efficient use of traffic service channels by reducing their number to the lowest number practically possible, thus enabling new call traffic to be carried on via the released traffic service channels. A conservation handoff is performed between an aircraft and the same radio base station or different radio base stations and is effectively imperceptible by the user.

In a Seizure handoff scenario, call handoff improves the signal quality of calls by effectively handing a traffic service channel off from the current radio base station to a new radio base station with better signal attributes. Seizure handoff occurs when one traffic service channel is not in use and another is having difficulty communicating clearly. Typically, a Seizure handoff is used to transfer traffic as an aircraft is flying out of range from the current radio base station into the range of the new radio base station. Another cause for handoff would be interference caused by external stimuli. In either case a degradation in call quality would be detected, as is fully described below, and a handoff would be performed to escape the interfering source. A Seizure-type call handoff (Seizure handoff) is performed inside an aircraft radio unit when 1 or 2 user service channels are in use on a first traffic service channel and a second traffic service channel is idle. The idle traffic service channel seizes a channel at the new radio base station. Once the channel is established, the user service channels are transferred from the old traffic service channel to the new traffic service channel. Once the transfer is complete, the old traffic service channel is broken down and the calls are now being carried by the new traffic service channel on different radio base station depending on the available traffic service channels. A Seizure handoff is transparent to the user as only a few pulse code modulation (PCM) frames are lost during the transfer.

Another advantage with Seizure handoff is that the selection of the new radio base station also facilitates traffic grooming by choosing a radio base station with less traffic than other candidate ground stations. An aircraft can typically see 4 to 6 radio base stations (ground stations) at cruising altitude. By selecting less congested ground stations, traffic within that group of 4 to 6 ground stations is spread evenly, thus reducing the possibility of all the traffic going through one radio base station. Traffic grooming also benefits aircraft that can't "see" (communicate with) as many ground stations by attempting to maintain free channels at all ground stations within a quadrant.

Similar to the Seizure handoff scenario, call handoff is utilized in a Reservation handoff scenario to improve the signal quality of calls. However, in a Reservation Handoff scenario the airborne radio unit has both of its traffic service channels in use when conditions such as deteriorating signal quality indicate that a handoff is desirable for the calls operating on one or both traffic service channels. Note that the call handoff criteria are evaluated on a per traffic service channel basis. For a call handoff in a Reservation Handoff scenario (Reservation handoff), the new traffic service channels are selected and one or both of the traffic service channels are keyed down. Then the aircraft radio unit aircraft resets its operating frequency and is keyed up on a new channel that was reserved specifically for the handoff. Synchronization is re-achieved, and the voice/data path (call) is reconnected. During the handoff period in one embodiment of the present invention, the user experiences less than 2 seconds of silence while the handoff is in process. The same benefits in signal quality improvement and traffic grooming are derived as in Seizure handoff.

BRIEF DESCRIPTION OF THE DRAWINGS

Other objects and advantages of the invention will become apparent upon reading the following detailed description and upon reference to the drawings in which:

FIGS. 4A–4E are block representations of a conservation call handoff.

FIGS. 5A–5E are block representations of a seizure call handoff.

FIGS. 6A–6E are block representations of a reservation call handoff.

FIGS. 21–25 1 is a flowchart representing the steps taken in a reservation call handoff.

DESCRIPTION OF THE PREFERRED EMBODIMENT

Figure 1:
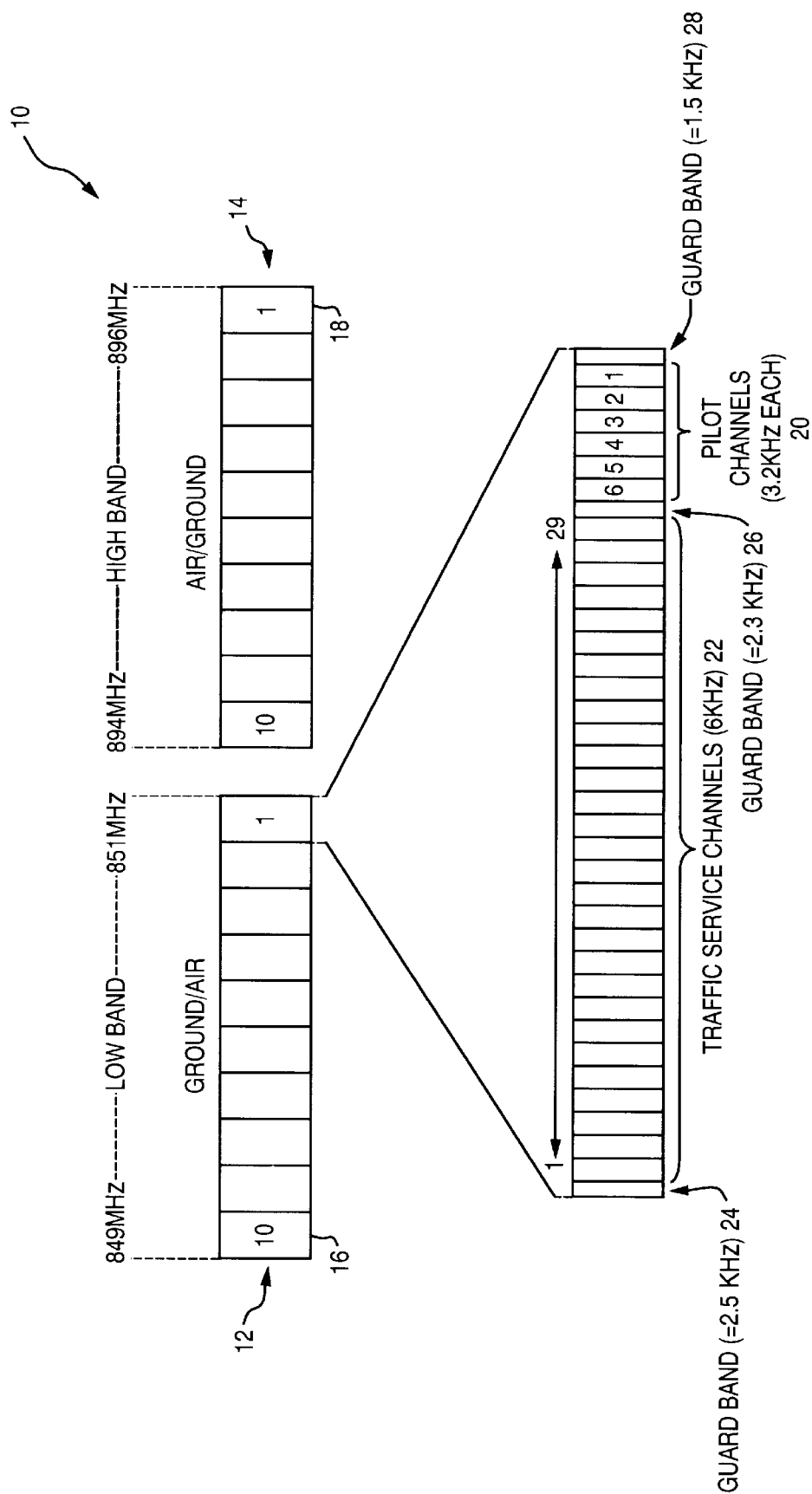
FIG. 1 is a diagram of the electromagnetic broadcast frequency spectrum allotted to communications utilize by one embodiment of a call handoff system of the present invention.

While the invention is susceptible to various modifications and alternative forms, a specific embodiment thereof has been shown by way of example in the drawings and will be described in detail. It should be understood, however, that it is not intended to limit the invention to the particular form described, but, on the contrary, the intention is to cover all modifications, equivalents, and alternatives falling within the spirit and scope of the invention as defined by the appended claims.

Limitation of other present systems have been overcome in the present system that provides means for conducting radio frequency telephone communications between many airline passengers and telephones served by landline telephone networks in a managed system.

Figure 2:
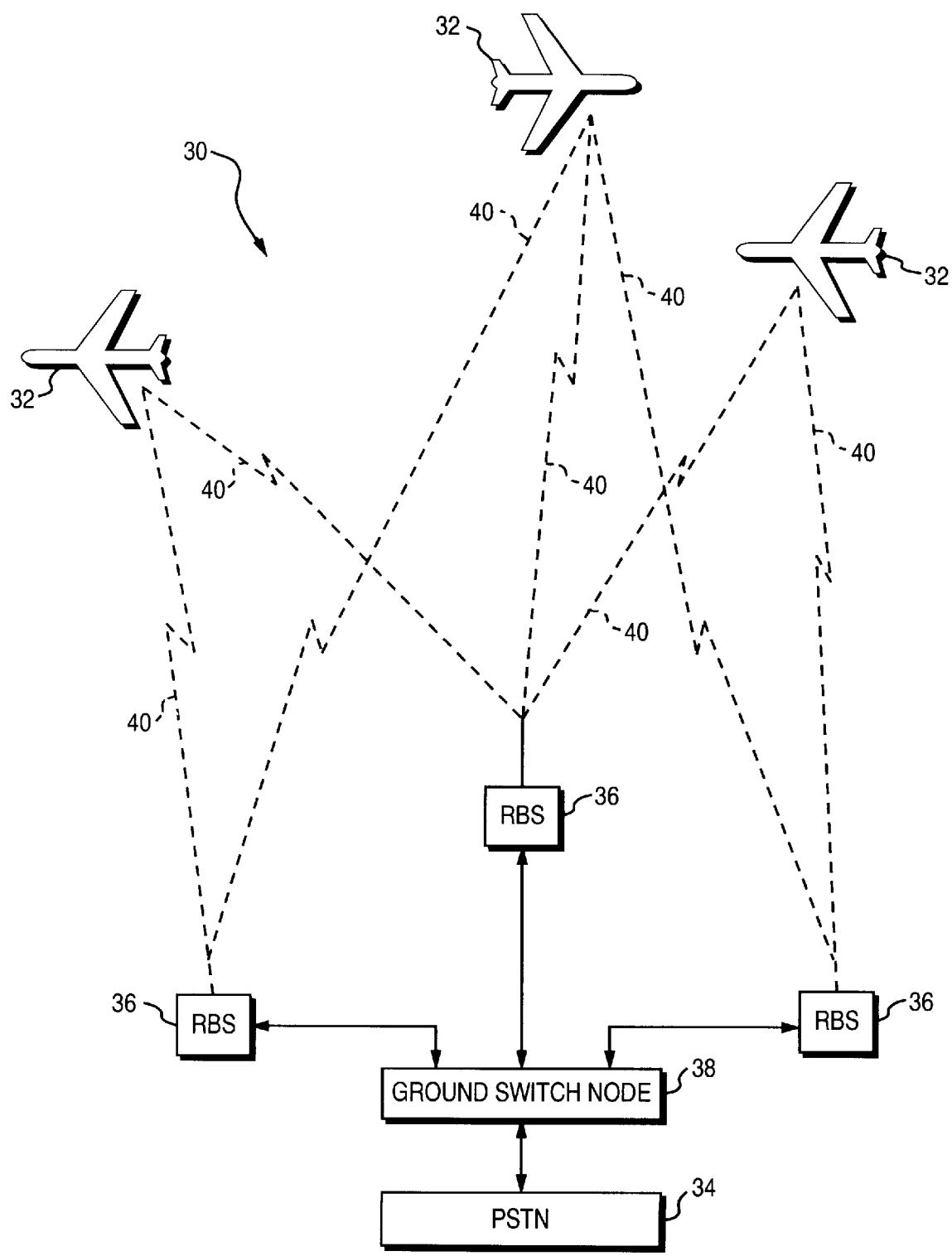
FIG. 2 is an overview block diagram of one embodiment of the present invention.

Referring now to the drawings, and particularly to FIG. 2, one preferred embodiment of the invention is described. The invention is related to an improved air/ground digital communications system 30 that operates to interconnect telephones (not shown here) contained aboard many geographically spaced operational aircraft 32 with a public switched telephone network 34. The system 30 also includes one or more geographically regionalized radio base stations 36 connected to a ground switch node 38. Each radio base station 36 selectively transmits and receives radio frequency signals 40 with the aircraft, while simultaneously relaying communications with the ground switch node 38, which ultimately switches the traffic to the public switched telephone network (PSTN) 34. In the case of a single radio base station 36, this communication is conducted via one pilot signal 20 and a plurality of radio frequency traffic service channels 22. Each radio base station 36 broadcasts a single pilot signal 20 for the benefit of all aircraft 32 within communication range of that radio base station 36. This pilot signal 20 informs aircraft 32 of traffic service channel 22 availability and frequency, and helps aircraft 32 to select a radio base station 36 for optimal, long term reception. Each radio base station 36 also utilizes user service channels 42 within the traffic service channels 22 to transmit and receive radio frequency encoded conversations 40 of passengers on aircraft 32.

The system 30 of the present invention manages a finite frequency spectrum 10. example, a 2 MHz frequency spectrum for each of base-to-aircraft and aircraft-to-base communication links is divided into 290, 6 KHz frequency channels. The present invention contemplates the inclusion of any number of transceivers within the radio base station 36, up to the predetermined number of user service channels 42 available within the finite frequency spectrum 10. However, as a practical matter radio base stations 36 located in areas which tend to experience lower levels of communication traffic may include fewer transceivers than the radio base stations 36 that reside in higher communication traffic areas. Preferably, no single radio base station 36 will include a transceiver for each user service channel 42 in the entire available frequency spectrun 10 because of a near certain probability that a large number of such transceivers would never be called into use.

Figure 3:
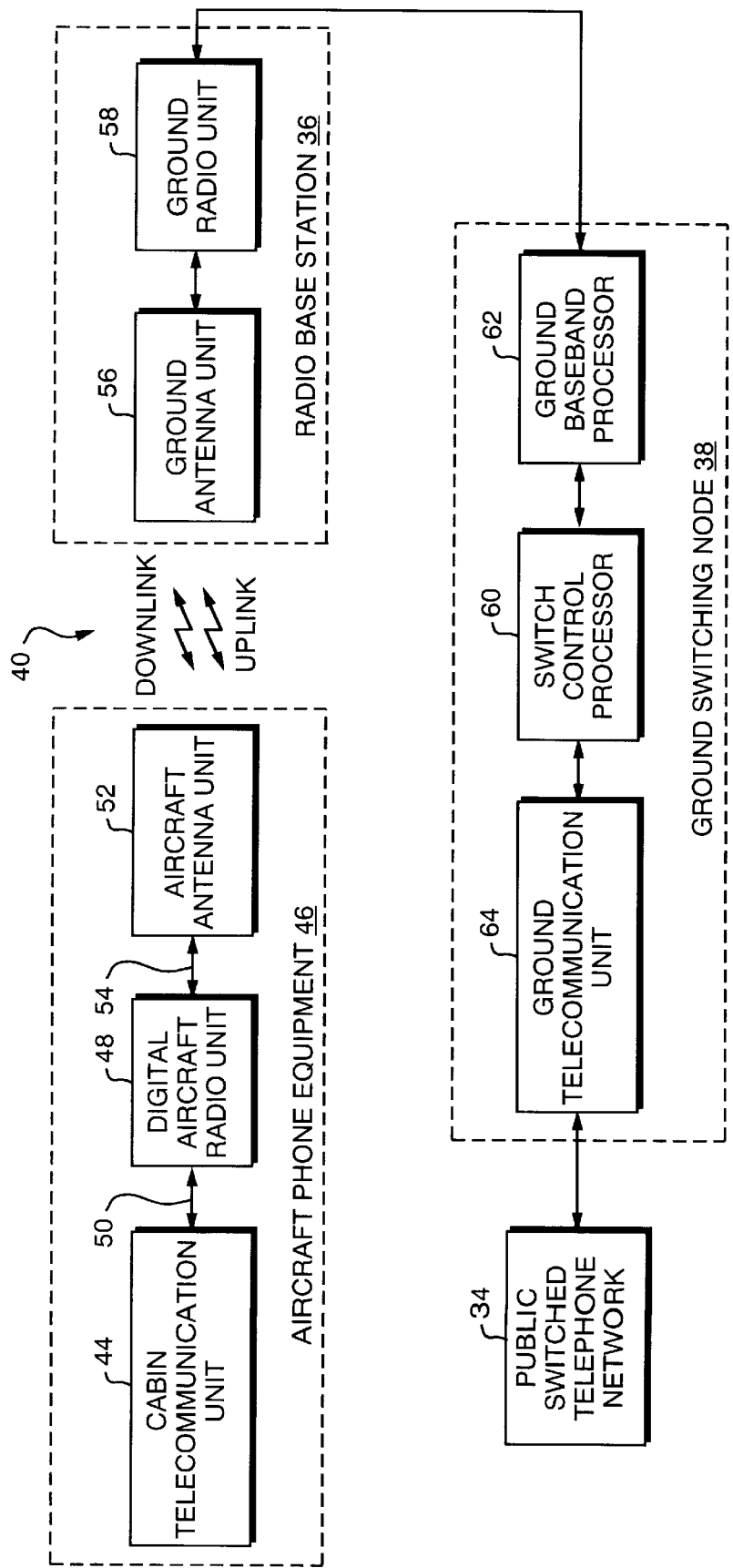
FIG. 3 is a block diagram of one embodiment of the present invention.

Referring now to FIG. 3, the specific features of the digital communications system 30 are explained. A cabin telecommunications unit 44 having several integrated functions is installed aboard each aircraft 32 as part of an aircraft phone system 46. The cabin telecommunications unit 44 provides an interface to the user/customer in the form of one or more telephones distributed throughout the aircraft 32 cabin. The cabin telecommunications unit 44 provides a user interface to voice, fax and data transmission services. Included are the telephone handsets and cabling. Note that U.S. Pat. No. 4,419,766 discloses techniques which may be adopted to make comparisons based upon signal strength and Doppler frequency shift error in order to select a radio base station 36 in accordance with the present invention. When a user requests placement of a call on the system 30, the cabin telecommunications unit 44 requests a traffic service channel 22 and an aircraft radio unit 48 selects an available traffic service channel 22 emanating from a radio base station 36 that the aircraft radio unit 48 most recently found to provide the best reception. Handoff is performed as fully described below.

The cabin telecommunications unit 44 provides a physical interface between users and the digital aircraft radio unit 48. Cables 50, specifically shielded twisted pair wires, connect the cabin telecommunications unit 44 to the digital aircraft radio unit 48. The aircraft radio unit 48 is itself coupled to a aircraft antenna unit 52 through coaxial cables 54 for sending and receiving radio transmissions. The aircraft radio unit 48 also includes controls for continually scanning through all the potential pilot signals 20 in the system 30 to determine the radio base station 36 of optimal reception as is described below. Note that the aircraft antenna unit 52 is a blade antenna. The aircraft radio unit 48 transmits and receives radio frequency signals 10 in accordance with the allotted frequencies described above for user service channels 42 and pilot channels 20. Furthermore, the aircraft radio unit 48 contains two separate transmitters and two receivers to support two traffic service channels 22 for voice, data, TDD (hearing impaired) and fax transmissions.

The aircraft phone system 46 can contain a plurality of transmitter/receivers (transceivers) to communicate over a plurality of traffic service channels 22. In one embodiment the aircraft phone system 46 communicates over two traffic service channels 22 with each traffic service channel 22 have two user service channels 42. Thus presently, the maximum number of calls which may simultaneously take place through any single aircraft 32 is limited to 2 times the number of transceivers included in the aircraft 32. As a practical matter the number of transceivers in an aircraft 32 will be limited to minimize expense and weight and to generally match the potential availability of user service channels 42 within the overall communication system 30 of the present invention.

The aircraft radio unit 48 contains transceivers, each connected by a coaxial cable to a signal combiner/splitter to combine outgoing communications and separate incoming communications from outgoing communications. The signal combiner/duplexer is connected to the antenna unit 52 by coaxial cable 54.

The interactions of the aircraft system will now be described. The cabin telecommunications unit 44 serves to direct operation of the aircraft phone system 46 of which it is a part. The cabin telecommunications unit 44 controls the aircraft phone system 46 with an aircraft processor (not shown) located in the aircraft radio unit 48, which has access and control to the transceivers. Thus, in response to commands from the aircraft processor, the transceivers transmit and receive signals to and from one or more radio base stations 36 over user service channels 42.

A digital code is incorporated into each aircraft transmission to a linked radio base station 36 in order to uniquely identify the transmitting aircraft 32. The aircraft processor in the aircraft radio unit 48 controls the transfer of call communications from the aircraft transceivers in the aircraft radio unit 48 to the cabin telecommunications unit 44 which provides the customers with their calls. Both visual and audio interface can be provided.

User service channel calls 42 are transmitted and received by a common antenna (not shown) in the aircraft antenna unit 52 and relayed to a receiver front end (not shown), which is a broad band receiver stage capable of receiving and amplifying signals covering the entire allotted spectrum 10 in the aircraft radio unit 48. The receiver front end provides signal gain and provides an intermediate frequency signal that is sent to all transceivers in the aircraft 32. The signal splitter reduces aggregate call signals into individual call signals. Such aggregate call signals originate from the radio base stations 36.

Pilot channel 20 signals enable asynchronous communications between the aircraft processor and the radio base station 36. The aircraft radio unit 48 is tuned to the pilot channel assigned to it which it demodulates to receive a pilot signal channel data stream. Under control of the aircraft processor the aircraft radio unit 48 monitors all pilot channels, receives the pilot signal data stream and all information from which signal strength and Doppler frequency shift error are calculated. The aircraft radio unit 48, via the aircraft processor, utilizes this information in selecting the radio base station 36 that will provide optimal reception. The aircraft processor also designates which traffic service channels of that radio base station 36 the aircraft is to utilize.

The digital communications system 30 further includes a large number of radio base stations 36. Each radio base station 36 includes a ground antenna unit 56 and a ground radio unit 58. The ground radio unit 58 further includes a ground radio baseband processor (not shown) that locally executes commands and controls the ground radio unit 58. Also, the radio baseband processor performs local housekeeping tasks for its radio base station 36 and controls communications with the ground switch node 38. The ground antenna unit 48 includes an antenna connected via a coaxial cable to a preamplifier (not shown). The preamplifier amplifies signals received by the antenna in the ground antenna unit 48 and passes the signals via another coaxial cable (not shown) to a downconverter (not shown) within the ground radio unit 58. The down converter converts the composite signal at 894–896 MHz to a 70 MHz (nominally intermediate frequency (IF)). The IF is distributed to transceivers within the ground radio unit 58 using coaxial cables (not shown).

A plurality of radio base stations 36 are provided to simultaneously transmit and receive conversations between one or more aircraft 32 and a radio base station 36 network. Control is conducted over a single pilot signal 20. Communications is conducted over a plurality of user service channels 42 (two user service channels 42 in one embodiment) for each traffic service channel 22 on each radio base station 36. The pilot signal 20 is broadcast for the benefit of all aircraft 32 within range of a given radio base station 36, i.e., within that cell. The pilot signal 22 serves to help each aircraft n selecting a radio base station 36 for optimal, long term reception, informs aircraft of the availability and frequency of currently available traffic service channels 22 (which carry encoded conversations).

The pilot signal is a continuously transmitted radio signal for transmissions of a ground-to-air control channel. The aircraft radio unit uses the pilot signal to: detect the presence of an radio base station 36 (using radio frequency (RF) signal strength and correct reception of broadcast data as a measure), determine radio base station 36 characteristics, and determine traffic service channel 22 availability (using a free channel list broadcast by the ground station).

The aircraft radio unit will monitor pilot channel characteristics including received signal quality, signal strength, rate of change of signal strength and pilot doppler shift for all radio base stations 36 which are RF-visible. Relative rankings will be determined from these factors. The radio base station 36 farthest ahead of the aircraft, of usable signal strength and signal quality and having at least one free traffic service channel 22, will be ranked highest. If no usable radio base station 36 exists ahead of the aircraft, the highest ranking radio base station 36 behind the aircraft will be that which has usable signal quality and the highest signal strength.

The aircraft radio unit 48 will be tuned to the pilot signal it is assigned and will monitor the uplink 12 data stream for messages directed to that aircraft 32. Each time conditions described below cross a threshold the pilot monitoring will switch to a new radio base station 36. A radio control link is exchanged between the aircraft radio unit 48 and the ground radio unit 58 over the traffic service channel 22. The radio control link carries the control signals passed that enable a handoff to occur.

Each ground radio 58 is capable of scanning all user service channels 42 assigned to an radio base station 36 and acting as a pilot channel 20 transmitter.

The radio base station 36 is connected to the ground switch node through a ground baseband processor 62. The ground baseband processor 62 is connected to the switch control processor 60 which in turn is connected to a ground telecommunication unit 64. The ground telecommunication unit 64 is coupled to the public switched telephone network 34 (PSTN) to allow calls to occur with any customer coupled to the PSTN 34. More specifically, the ground baseband processor 62 is the equipment responsible for translating between PCM (pulse code modulation) voice traffic from the aircraft radio unit 48 and low bit rate voice traffic from the PSTN 34.

Each traffic service channel 22 typically contains two user service channels 22. The number of user service channels 22 in use is coordinated between the aircraft radio unit 48 and the ground baseband processor. Each user service channel 42 is capable of transporting both call-related information (traffic, control, and credit card information) and non-call-related information (alarm, maintenance, and management information).

Each ground radio unit 58 will scan the traffic service channel 22 carrier frequencies assigned to its radio base station 36 and determine, per FCC Memorandum of Opinion and Order, whether each traffic service channel 22 carrier frequency is in use. The ground radio unit 58 will then construct a free channel list containing all free traffic service channel 22 carrier frequencies to which ground radios 58 have been tuned. 18 The free channel list will be transmitted over the pilot channel 20 as part of the radio base station 36 information broadcast within the ground to air control pilot channel 20. The ground radio unit 58 will also generate and transmit a list of all traffic service channel 22 carrier frequencies in use. The aircraft radio unit uses the free channel list to select the highest ranking radio base station 36 when initiating a call.

Digital signals are transmitted from the aircraft antenna radio unit 52 are detected by receiving antennas in the ground antenna unit 56 on the ground, preamplified, reduced to component channels by a downconverter/receive splitter (not shown), and distributed to the plurality of radio base station 36 transceivers. Similarly, outgoing digital signals from the plurality of radio base station 36 transceivers undergo aggregation in a transmit combiner, before being broadcast by a transmitting antenna.

The ground baseband processor 62 controls the interface between the ground switch node 38 and the radio base station 36, it also performs local housekeeping tasks.

Additionally, when regional aircraft occupy previously vacant voice channels, the radio base station 36 responds by adjusting the pilot signal 20 to reflect the newly occupied user service channels 42.

Aboard each aircraft 32, an aircraft radio unit 48 is coupled with the aircraft antenna unit 52 to sample all pilot signals offered within the reception area of the aircraft. The air radio controller compares the relative strength and Doppler frequency shift error of each of the pilot signals and selects the radio base station 36 that will supply the strongest, most enduring service.

For transmitting, each ground radio unit 58 is capable of transmitting the pilot signal with the ground antenna unit 56, however, only one is designated to do so by the radio baseband processor. The remainder of the ground radios are allocated to carry calls (voice and data traffic) on traffic service channels 22 selected by the ground radio baseband processor.

The output of each ground radio is an 849–851 MHz signal that contains pilot channel 20 data and user voice and data traffic. The ground radio unit's transmitter is connected via coaxial cable to a combiner/amplifier (not shown). The combiner/amplifier, combines the low level output of the ground radio unit 58 and amplifies the composite signal to 10 watts/channel. The composite transmit signal is then filtered using a band pass filter whose center frequency is 850 MHz (nominally). The output of the transmit bandpass filter is then passed via coaxial cable to a transmit antenna in the ground antenna unit 56.

Each radio base station 36 transceiver contains a microprocessor based I/O interface (not shown) which is used to communicate with equipment external to the transceiver, such as the radio baseband processor. Each radio base station 36 is designed to accommodate common types of ground radios within the ground radio unit 58. However, ground radios preferably have common I/O designs, so that control from the radio baseband processor can be uniformly administered.

Accordingly, the ground radio baseband processor sends a command to each of transceivers to specify which frequency channel, if any, to use in conducting communications between radio base station 36 and aircraft 32. Preferably, to prevent interference, no two transceivers utilize a common frequency channel. Commands may be sent from the radio baseband processor to transceivers within the ground radio unit 58 in real-time to dynamically reallocate frequency channels.

In response to the radio baseband processor, a primary broadcast transmitter sends the pilot signal 20 of the radio base station 36 to any aircraft 32 within range. Broadcast transmitters are arranged to operate in a configuration, so that the radio baseband processor or alarm system can promptly cause a switch to substitute another transceiver for the primary broadcast transmitter in case the latter fails. Such a failure condition might arise, for example, when the power level of the primary broadcast transmitter falls below a predetermined threshold.

The radio baseband processor performs the central computing functions for each radio base station 36, including regulation of operation of the radio base station 36 components, directing radio base station 36 communications, and coordinating use of the radio base station 36's assigned spectrum with other services. In the preferred embodiment, the radio baseband processor includes a computer based upon an Intel 80386 microprocessor designed to operate at 20 MHz.

As discussed above, each radio base station 36, through its primary or secondary broadcast transmitter, broadcasts a pilot channel 20 data stream for receipt by all aircraft systems within range of the radio base station 36 (RBS). Each of these streams of data represents a message which is continually repeated and updated as necessary. Generally speaking, the message includes channel availability information which aircraft systems use in deciding which voice channels to communicate upon.

Turning now to FIGS. 4, 5 and 6 there is illustrated generally how call handoff is performed in three scenarios, i.e., conservation handoff, seizure handoff and reservation handoff. Each type of handoff is explained in much greater detail below. Note that the types of user calls carried on each user service channel is for illustrative purposes only. Each user service channel has the capability of carrying all types of communications defined above.

In FIGS. 4A–4E a conservation handoff is generally shown. Beginning in FIG. 4A, an initial situation with a first aircraft radio unit traffic service channel (ARAD TSC 1) has both user service channels, specifically, user service channel 1 (USC1) and user service channel 3 (USC3) carrying a voice call (VOICE 1) and a facsimile call (FAX 1), respectively. Aircraft radio unit traffic service channel 2 (ARAD TSC 2) is carrying on subband B user service channel 5 (JSC5) and user service channel 7 (USC7), carrying data call 1 (DATA1) and voice call 2 (VOICE 2), respectively. FIG. 4A illustrates two fully utilized traffic service channels. FIG. 4B shows FAX1 and VOICE2 as discontinued, leaving two partially used traffic service channels (a conservation-type call handoff situation). Conservation handoff begins in FIG. 4C where the DATA1 call is duplicated on USC3, the "new" user service channel, while continuing on USC5, the "old" user service channel. In FIG. 4D the DATA1 call is effectively transferred to USC3 and the old user service channel (USC5) is idled. Next, in FIG. 4E the aircraft radio unit traffic service channel 2 (ARAD TSC 2) is turned off, allowing that traffic service channel to be acquired by a new caller on a different aircraft or the same aircraft.

In FIGS. 5A–5E a seizure handoff is generally shown. Beginning in FIG. 5A, an initial situation with a first aircraft radio unit traffic service channel (ARAD TSC 1) has both user service channels in use, specifically, user service channel 1 (USC1) and user service channel 3 (USC3) carrying a first voice call (VOICE 1) and a second voice call (VOICE 2), respectively. Aircraft radio unit traffic service channel 2 (ARAD TSC 2) is off. FIG. 5A illustrates one fully utilized traffic service channel and one idle traffic service channel when communications quality begin to deteriorate (a seizure situation). Seizure handoff begins in FIG. 5B which shows ARAD TSC 2 locating an appropriate subband and channel on the same or another radio base station. In FIG. 5C both calls on ARAD TSC 1, specifically VOICE 1 and VOICE 2 are duplicated on "new" user service channels USC5 and USC7, respectively. In FIG. 5D, the "old" user service channels USC1 and USC3 are idled, while VOICE 1 and VOICE 2 calls continue on the "new" user service channels USC5 and USC7. Next, in FIG. 5E the aircraft radio unit traffic service channel 1 (ARAD TSC 1) is turned off, allowing that traffic service channel to be acquired by a new caller on a different aircraft or the same aircraft.

In FIGS. 6A–6E a reservation handoff is generally shown. Beginning in FIG. 6A, an initial situation with a first aircraft radio unit traffic service channel (ARAD TSC 1) has both user service channels, specifically, user service channel 1 (USC1) and user service channel 3 (USC3) carrying a first voice call (VOICE 1) and a second voice call (VOICE 2), respectively. Aircraft radio unit traffic service channel 2 (ARAD TSC 2) also has both user service channels in use, specifically, user service channel 5 (USC5) is carrying a third voice call (VOICE 3) and user service channel 7 (USC7) is carrying a data call (DATA). FIG. 6A illustrates two fully utilized traffic service channels when, like in the seizure handoff scenario, communications quality begin to deteriorate on ARAD TSC 1 (a reservation situation). Note that the primary distinction between a seizure scenario and a reservation scenario is whether there is an idle traffic service channel for the existing calls to be switched to. In FIG. 6B, unlike in FIG. 5B, no user service channels have been idled, however, a search is made for the best traffic service channels to switch VOICE 1 and VOICE 2 to. Actual handoff begins in FIG. 6C which shows ARAD TSC 1 keying down VOICE 1 and VOICE 2, leaving USCI and USC3 idle. In FIG. 6D, ARAD TSC 1 has located a new subband and channel. In FIG. 6E, VOICE 1 and VOICE 2 calls are continued on the "new" user service channels USC1 and USC3, now operating on a different channel.

Turning now to FIGS. 7–28 there is illustrated specifically how call handoff is performed in three scenarios, i.e., conservation handoff, seizure handoff and reservation handoff.

Figure 7:
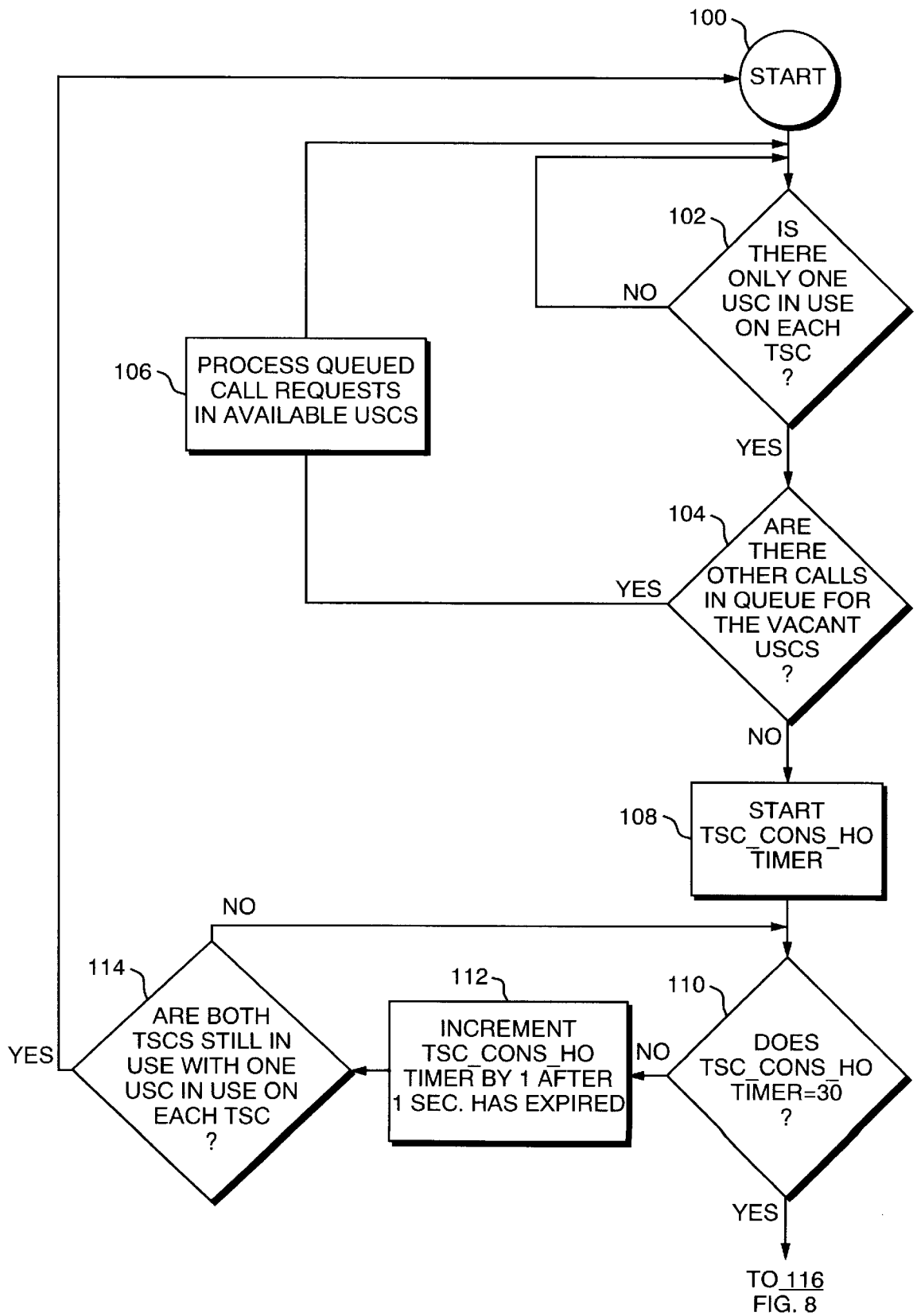
FIGS. 7–15 is a flowchart representing the steps taken in a conservation call handoff.

A flow chart illustrating conservation call handoff is shown in FIGS. 7–15. In FIG.7 the start block 100 defines the initial condition of the system just prior to the present invention being ready to perform a conservation call handoff. A conservation handoff will not be performed unless a conservation situation to known to exist. In the present invention a conservation situation is defined as a situation in which there are at least two traffic service channels 22 wherein each traffic service channel 22 has only one respective user service channel 42 in use by customer calls. If other factors permit, as is more thoroughly described below, the calls on the traffic service channels 22 are combined into one traffic service channel 22 and the other traffic service channel 22 can potentially be released.

In step 102 the present invention determines whether a conservation situation exists by checking the status of every traffic service channel 22. If a conservation situation does not exist, then control of the present invention continues waiting for the condition to occur. If there is, then control of the present invention proceeds to step 104. In step 104 control checks to see if there are any other calls waiting in a queue and any user service channels 42 are available. If so, then those calls are processed in step 106 then control returns to step 102. If there are no other calls waiting in step 104, then control proceeds to step 108, wherein a timer is initiated. In step 110, control looks at whether the timer TSC_CONS_HO is equal to 30. If not control proceeds to step 112 where the timer is incremented by 1 every second. In step 114 control examines whether there is no longer a conservation situation, specifically, whether both traffic service channels are still partially in use, if not go to step 100, if so go back to step 110. In step 110 if the TSC_CONS_HO timer equals 30 seconds go to step 116 in FIG. 8. In short, if the conservation situation ends before the timer counts thirty seconds, i.e. there is no longer at least two user service channels 22 in use during the thirty seconds, then control returns to step 100, otherwise, control goes to step 116.

Figure 8:
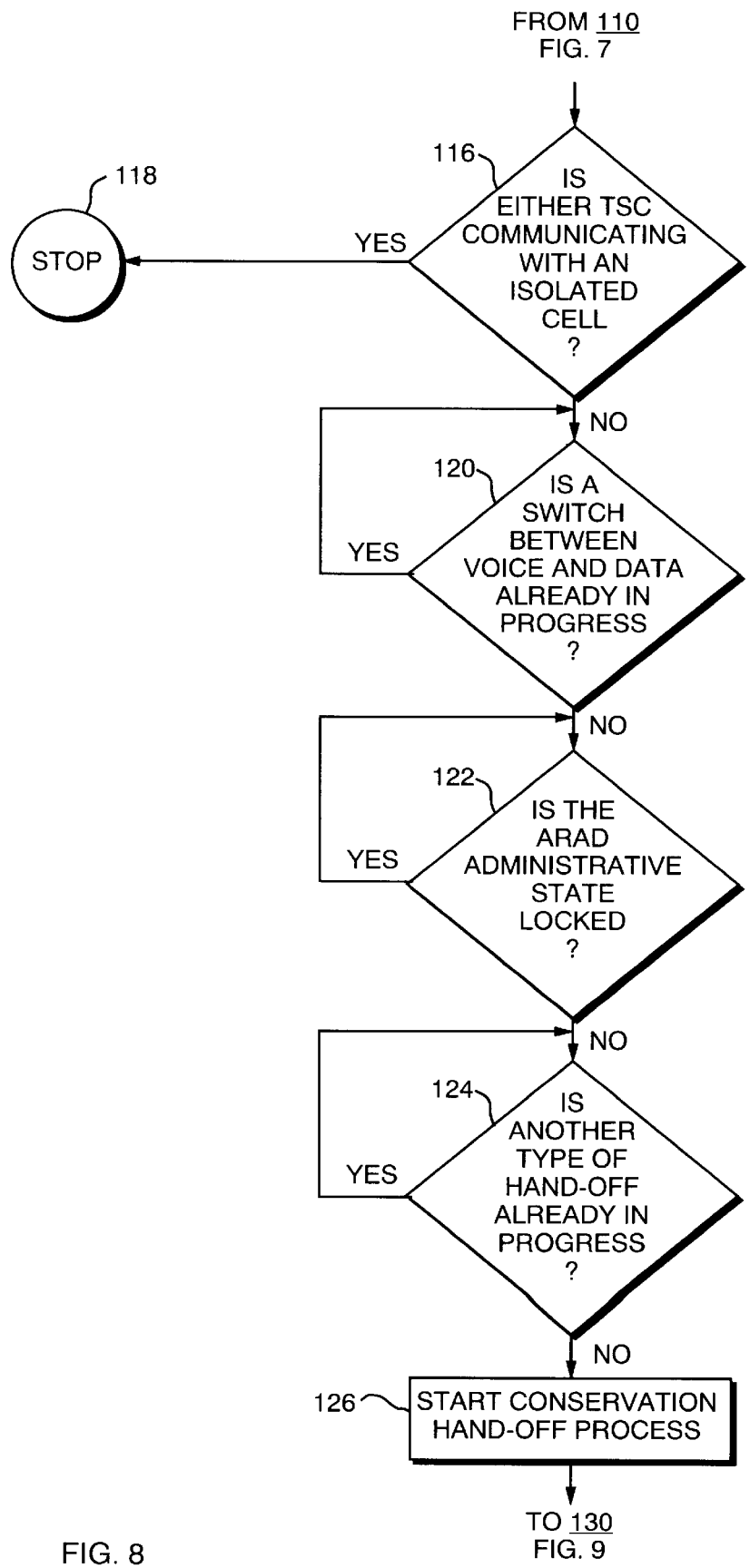

In step 116 on FIG. 8, control determines whether either of the two partially used traffic service channels 22 is communicating with an isolated cell. There are two types of an isolated cells, one is a radio base station 36 which is not attached to a ground switching node that is part of the GTE Airfone network, the other type of isolated cell is not overlapped with other cells within the range of the aircraft 32. If either of the two traffic service channels 22 are communicating with an isolated cell then that traffic service channel 22 is marked as being connected to an isolated cell and is accordingly treated as being unavailable for call handoff and control stops the handoff in step 118, if not, control proceeds to step 120. In step 120, control determines whether any of the user service channels 22 are being switched between voice and data transmissions, if so control will wait until the switch is complete. If no switch is occurring or has completed, control proceeds to step 122, where control determines whether the digital aircraft radio unit 48 is in an administrative state. If the digital aircraft radio 48 is locked, thus allowing a maintenance action to be conducted, then control will wait until the administrative state is unlocked. If the digital aircraft radio 48 is not in an locked administrative state, or no longer in an locked administrative state, then control proceeds to step 124 to determine if another type of handoff is already in progress. If another type of handoff is in progress, control waits for that handoff to complete before continuing. Note that control continuously checks to see if the conservation handoff situation exists. If at any time the conditions for handoff are not satisfied then the handoff is canceled, even if the handoff is being held in abeyance. If there is no longer any other type of handoff in progress, control proceeds to step 126 where the conservation handoff process is begun.

Figure 9:
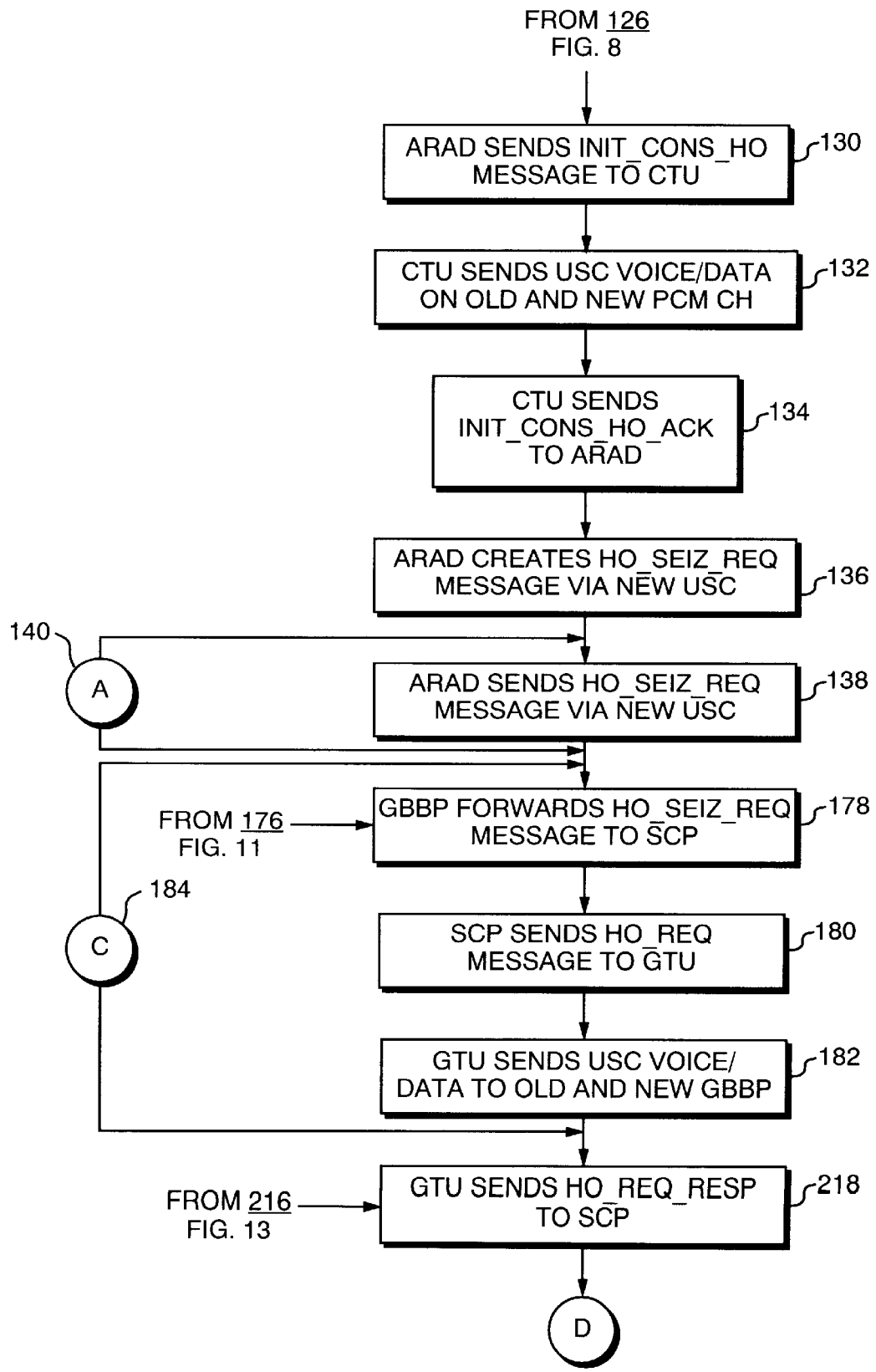

In FIG. 9, a conservation handoff is begun in step 130 where the digital aircraft radio 48 sends a message (INIT_CONS_HO) to the cabin telecommunication unit 44. The message contains information identifying which user service channels 42 and traffic service channel 22 of the call to be moved and its destination user service channels 42 and traffic service channel 22. The cabin telecommunication unit 44 responds to the INIT_CONS_HO message in step 132 by sending the call's voice or data (assume voice and data is all inclusive) on both the present user service channels 42 and the destination user service channels 42 in parallel. Once the INIT_CONS_HO message is received, call requests for the present and destination user service channels 22 are queued until the handoff is complete. Furthermore, the cabin telecommunication unit 44 sends an acknowledgement signal (INIT_CONS_HO_ACK) in step 134 to the digital aircraft radio 48 indicating that parallel transmission is taking place. Control proceeds to step 136 wherein the digital aircraft radio 48 creates a message containing information about the old and new channels, handoff type, in this case a conservation handoff, the aircraft ID, a call reference number, a call bearer capability, i.e. voice, data, fax, or TDD (telephone device for the deaf), and the destination traffic service channel 22 and user service channels 42.

Next the aircraft radio unit 48 sends the HO_SEIZ_REQ message via the new user service channel to the radio base station 36. Detail of this process is provided in part "A" 140 of the flow chart beginning in FIG. 10.

Figure 10:
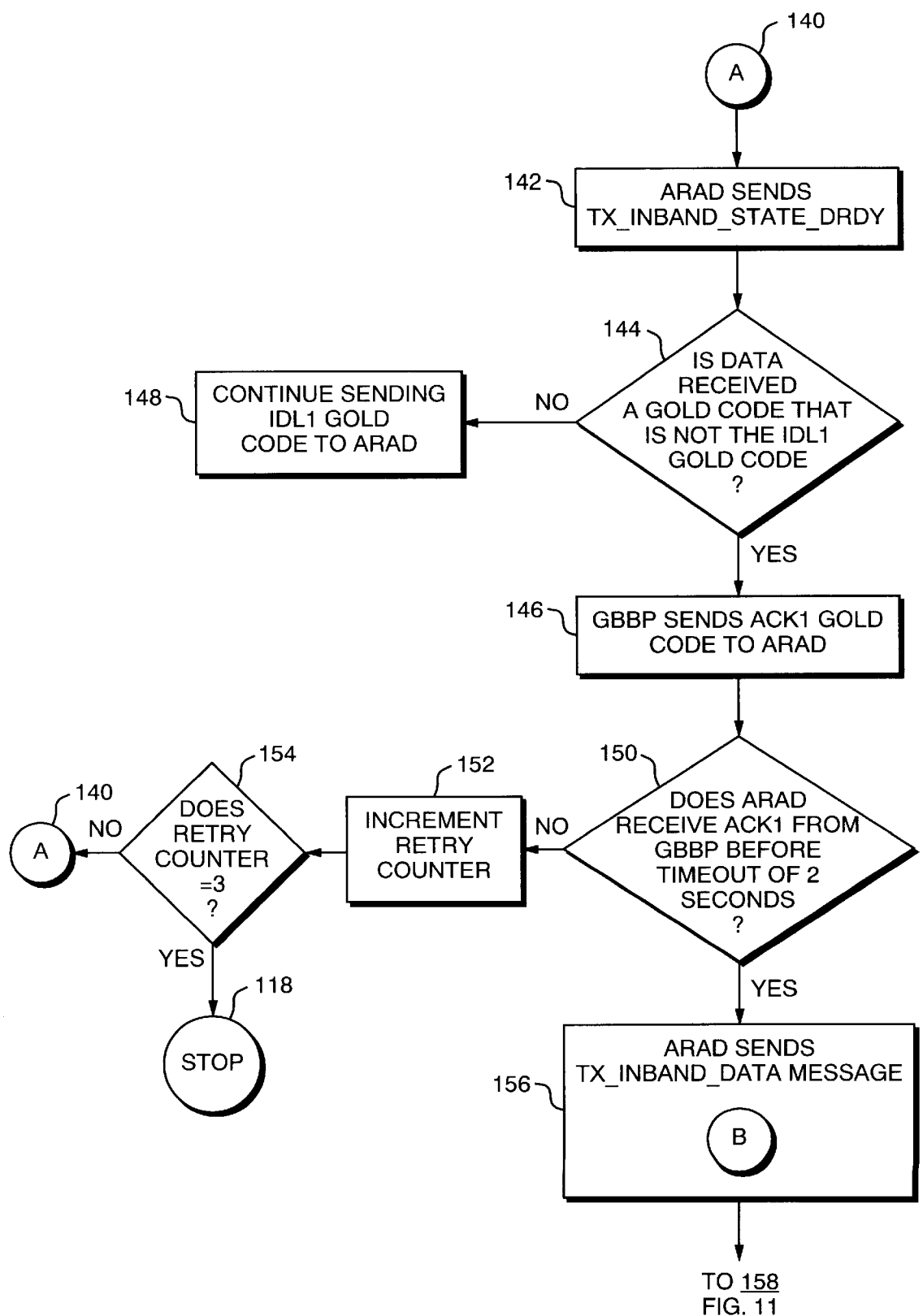
Figure 11:
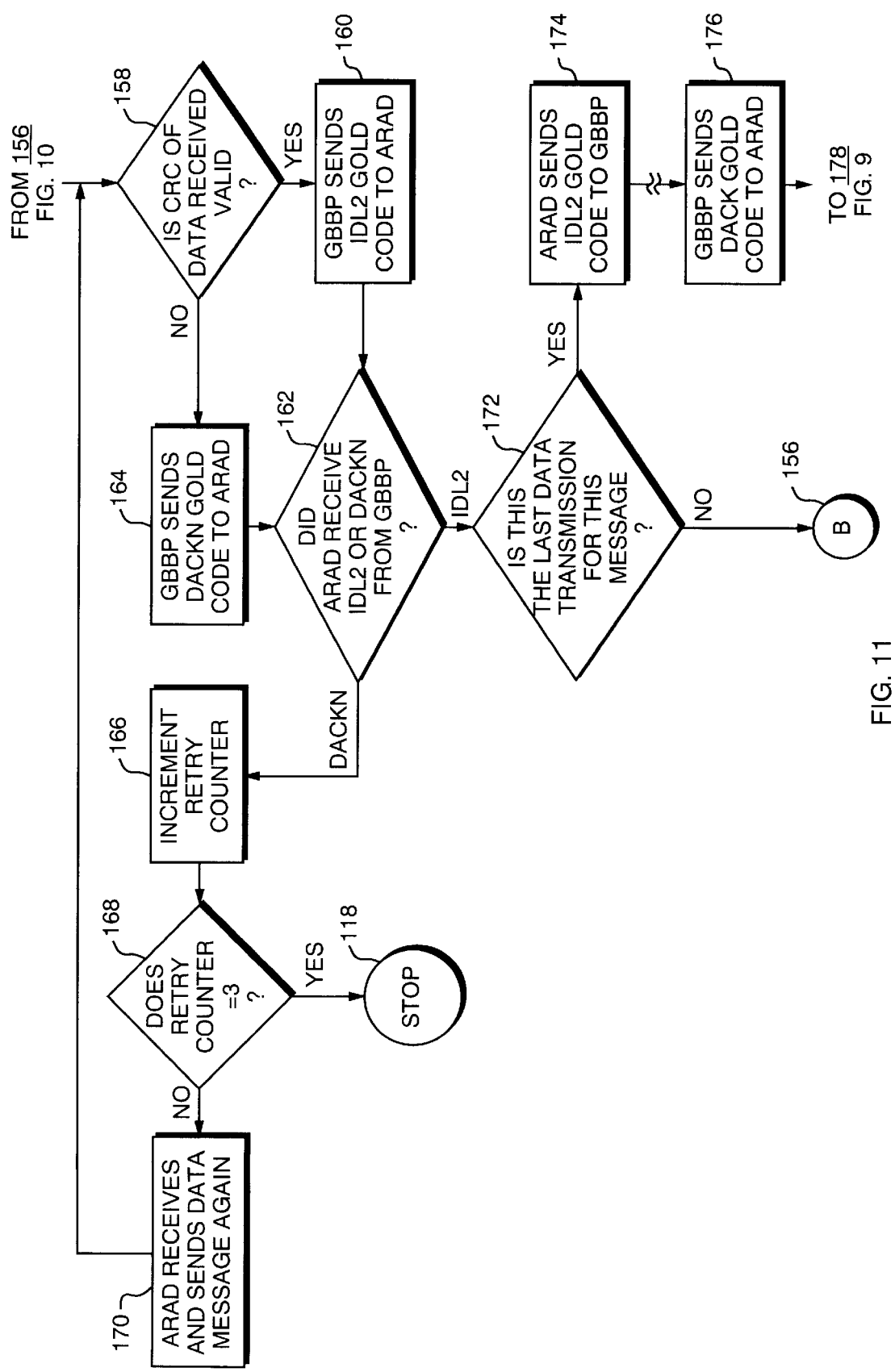

On FIG. 10, part A 140, step 142, the aircraft radio unit 48 sends a data ready gold code to the radio baseband processor in the radio base station 36 which in turn forwards the message to a ground baseband processor 62 in the ground switching node 38. The message is sent on a channel that will carry the new user service channel. If data received by the ground baseband processor 62 has an incorrect gold code, thus indicating error, then the ground baseband processor 62 will continue to receive the aircraft radio unit 48 IDLI transmissions until the gold code is followed in step 144. The gold code is a known way of ordering bits and check bits to allow errors in transmission to be detected. If the gold code is received and indicates no errors are present then the ground baseband processor 62 sends an acknowledge signal (ACK1) to the aircraft radio unit 48 in step 146, acknowledging readiness to receive data, otherwise the radio base station 36 will continue sending the IDL1 gold code to the aircraft radio unit 48 in step 148. The radio baseband processor in the ground radio unit 58 forwards the message to its aircraft radio unit 48. in step 150, if the aircraft radio unit 48 did not receive the acknowledge signal (ACK1) from the ground baseband processor before a time out of 2 seconds the aircraft radio unit 48 will begin seizure request again by incrementing the retry counter in step 152. Then in step 154 if the retry counter is equal to three (it began at zero before step 152) then handoff is stopped in step 118, otherwise, sequence "A" 140 is begun again at 140.

However, if the acknowledge signal (ACK1) was received then the aircraft radio unit 48 sends the following informational elements: a protocol discriminator, message type indicator, PCM channel, handoff type, aircraft ID call reference, call bearer capability and destination traffic service channel/user service channel ID to the ground baseband processor as part of a (TX_INBAND_DATA) message at step 156. In steps 158–176 of a gold code retry block, control uses a counter to retry sending the specified gold code three times before giving up in step 118. If a CRC (cyclic redundancy check—an error detection code) calculated from the message received from the aircraft radio unit is correct when compared against a valid CRC transmitted with the above message in step 158, then in step 160 the ground baseband processor 62 sends an IDL2 gold code to the aircraft radio unit 48 acknowledging receipt of the valid message, then control proceeds to step 162.

In step 158, if the CRC received is not valid then control proceeds to step 164 where the ground baseband processor 62 sends a data acknowledge not gold code (DACKN gold code) to the aircraft radio unit 48 and control proceeds to step 162. In step 162, if the aircraft radio unit 48 received DACKN from the ground baseband processor 62 then the aircraft radio unit 48 increments a retry counter in step 166 and control flows to step 168. If the retry counter is equal to 3 in step 168 then handoff is stopped in step 118, if not then in step 170 the aircraft radio unit receives DACKN and sends the data message again as it did in step 156 and control flows to step 158. Back in step 162, if IDL2 gold code was received by the aircraft radio unit 48 then control proceeds to step 172. In step 172 the aircraft radio unit 48 determines if all the data for the seizure request has been sent by examining whether this is the last data message transmission for this message. If it is not then control flows back to step "B" 156, if it is then in step 174 the aircraft radio unit 48 sends IDL2 gold code to the ground baseband processor 62 when the data message is complete in step 174. Next, in step 176 the ground baseband processor 62 sends a DACK (data acknowledge) gold code to the aircraft radio unit 48 when the ground baseband processor 62 determines that the entire message has been transmitted and receives and IDL2 gold code from the aircraft radio unit 48. Note that the system retries all gold code signalling as described above in steps 158–176 if error is encountered.

Returning to FIG. 9, in step 178 the new ground baseband processor 62 forwards the data message to the switch control processor 60. In step 180 the switch control processor 60 sends a handoff request message to a ground telecommunications unit 64 within the ground switching node 38 specifying a new logical port inside the ground telecommunication unit 64 with the associated call reference number. More specifically, inside of the ground telecommunications unit 64 there is a configuration table that associates physical and logical ports carrying calls. The logical port number of the old and new ports on the ground telecommunications unit 64 is used by the switch control processor 60. The call reference number is used to avoid confusion between calls from the same aircraft by allocating a unique number with every user call. The call reference number is assigned sequentially by the cabin telecommunications unit 44 starting with the number 1 every time the aircraft phone system 46 powers up. In step 182 the ground telecommunications unit 64 sends user service channels 42 voice/data to the old and new ground baseband processors 62. More specifically, upon receipt of the handoff request message, parallel user service channels 42 call paths are established on old and new ground baseband processors, any state changes to the call, or process of new calls on proposed handoff channels are held in abeyance.

Figure 12:
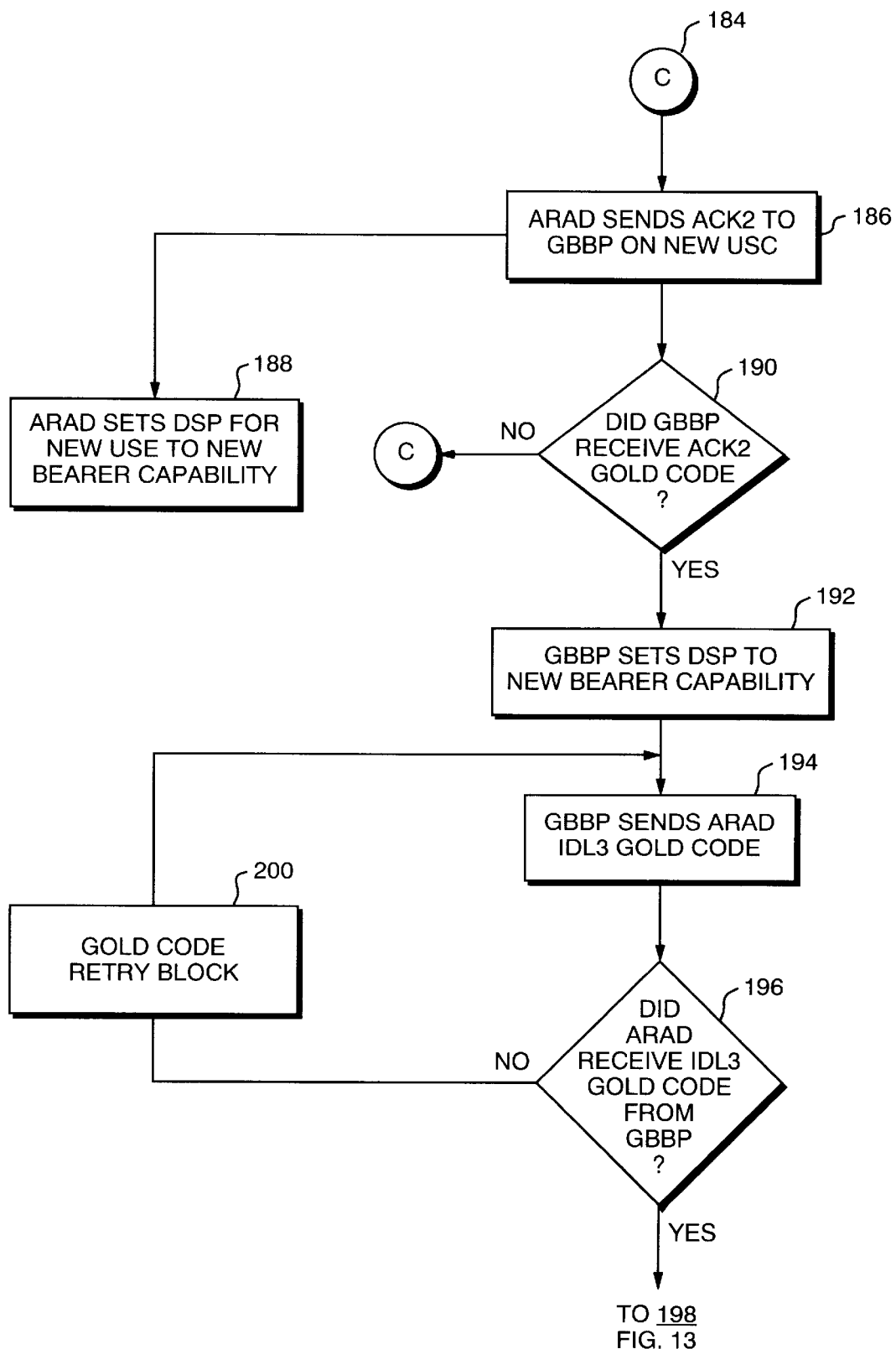
Figure 13:
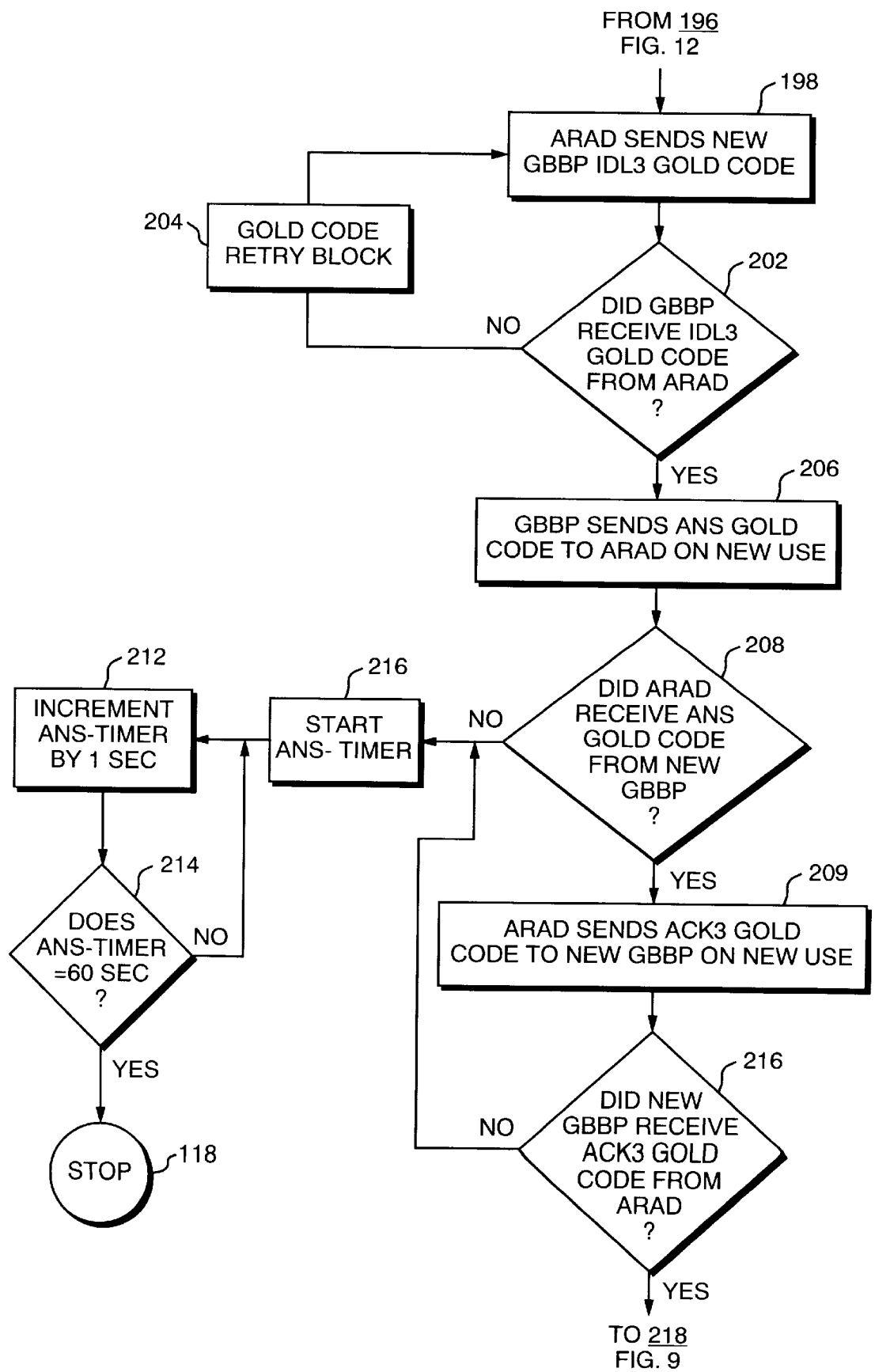

In FIGS. 9 and 12, step 184 is labelled "C" to indicate it provides detail for the three steps 178, 180 and 182. In FIG. 12, step 186 the aircraft radio unit 48 sends an acknowledge signal (ACK2) in a gold code format to the ground baseband processor 62 over the new user service channels 42 in order to acknowledge receipt of the ground baseband processor's 62 data acknowledge signal (DACK) on the new user service channels 42. As part of step 186, in part 188 the aircraft radio unit 48 sets a digital signal processor to a new bearer capability. Bearer capability refers to the different software routines used for digitally signal processing voice, data, facsimile and TDD calls. Once the proper software routine is loaded, the radio is considered "capable" of carrying the various types of call traffic. In step 190, if the ground baseband processor 62 did not receive the ACK2 gold code then control is returned to step 184, if it was received then control proceeds to step 192.

In step 192 the ground baseband processor 62 sets its digital signal processor (not shown) to new bearer capability, i.e. voice, data, fax, TDD, based on the handoff seizure request message. In step 194 the ground baseband processor 62 sends the aircraft radio unit 48 an IDL3 gold code. More specifically, after the bearer capability is set the new ground baseband processor sends over the new user service channels 42 the IDL3 gold code indicating the bearer capability is set. In step 196 if the aircraft radio unit 48 received the IDL3 gold code control proceeds to step 198 in FIG. 13, if not the ground baseband processor retries the IDL3 gold code transmission in step 200 as described above with regard to the gold code retry block described above. If the aircraft radio unit received the IDL3 gold code then in step 198, FIG. 13, the aircraft radio unit 48 sends the new ground baseband processor 62 the IDL3 gold code upon receipt of IDL3 gold code from the new ground baseband processor 62 on the new user service channels 42, indicating readiness for user data.

Steps 202 and 204 indicate where the ground baseband processor 62 waits to receive the IDL3 gold code from the aircraft radio unit 48 with an appropriate gold code retry in step 204. In step 206, when the ground baseband processor 62 receives the IDL3 gold code from the aircraft radio unit 48 it sends back to the aircraft radio unit 48 an answer gold code (ANS) followed by user data on the new user service channels 42. In step 208 if the aircraft radio unit 48 received the ANS signal from the new ground baseband processor 62 then in step 209 the aircraft radio unit 48 sends an acknowledge signal (ACK3) to the new ground baseband processor 62 on the new user service channels 42. However, if the ANS signal was not received by the aircraft radio unit 48 then the aircraft radio unit 48 initiates in steps 210–214 a 60 second counter during which time the signal must be received or the handoff attempt will be aborted. In step 216 if the ACK3 signal was received by the new ground baseband processor 62 then control is returned to step 218 on FIG. 9.

In FIG. 9, step 218, the ground telecommunications unit 64 sends a handoff request response to the switch control processor 60 both are in the ground switching node 38) acknowledging that the resources requested are available and that the parallel user service channels on the old and new ground baseband processors 62 have been established.

Figure 14:
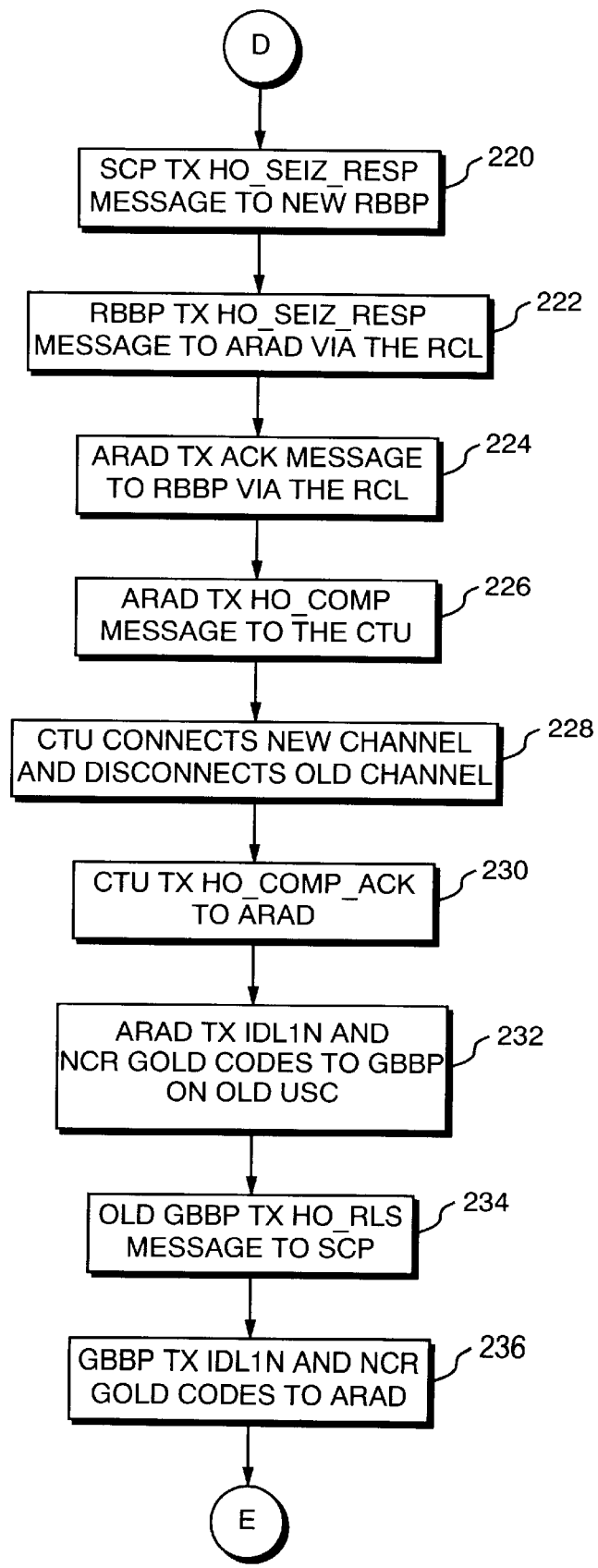

In FIG. 14, step 220 the switch control processor 60 sends to the radio baseband processor the handoff seizure response message to the radio baseband processor that will carry the new user service channel. In step 222 the switch control processor 60 sends a handoff seizure response message (HO_SEIZ_RESP) to the aircraft radio unit 48 using the radio control link. The message informs the aircraft radio unit 48 that the ground path for the new user service channel is established. In step 224 the aircraft radio unit 48 sends an acknowledgment signal (ACK) indicating that the ground path for the new user service channels 42 is established. In step 226 the aircraft radio unit 48 sends a handoff complete signal (HO_COMP) to the cabin telecommunications unit 44 instructing the cabin telecommunications unit 44 to switch both the transmit and receive paths to the new user service channel. In step 228 the cabin telecommunications unit 44 connects the new user service channel and disconnects the old channel. In step 230 the cabin telecommunications unit 44 sends a handoff complete acknowledge (HO_COMP_ACK) to the aircraft radio unit 48 when the cabin telecommunications unit 44 has completed switching the call to the new user service channel and disconnecting the call from the old user service channel. In step 232 the aircraft radio unit 48 sends IDL1N and NCR (normal call release) gold codes to the ground baseband processor 62 on old user service channel upon receipt of the handoff complete acknowledge signal from the cabin telecommunications unit 44. The aircraft radio unit 48 sends IDL1N and normal call release (NCR) gold codes to the radio baseband processor on the old user service channel. The radio baseband processor forwards the codes to the old ground baseband processor 62. In step 234 the old ground baseband processor 62 sends a handoff release (HO_RLS) signal to the switch control processor 60. In step 236 the ground baseband processor 62 sends IDL1N and NCR gold codes to the aircraft radio unit 48 acknowledging receipt of the handoff call release and forwarding call release to the switch control processor 60.

Figure 15:
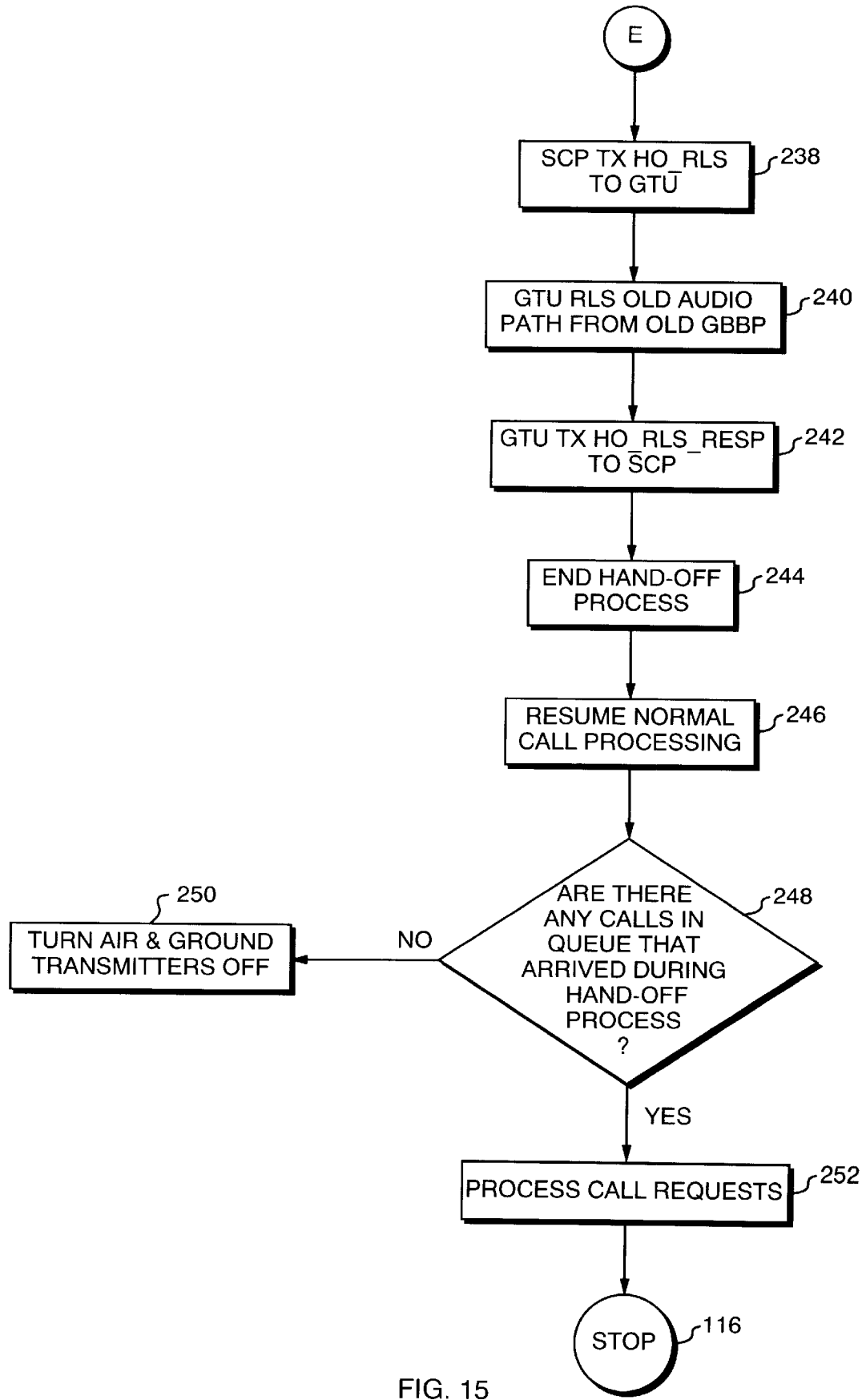

In FIG. 15, step 238, the switch control processor 60 sends the handoff release signal (HO_RLS) to the ground telecommunications unit 64. In step 240 the ground telecommunications unit 64 releases the old audio path from the old ground baseband processor 62. In step 242 the ground telecommunications unit 64 sends a handoff release response signal (HO_RLS_RESP) to the switch control processor 60. Once the old voice/data path is disconnected from the ground baseband processor 62 the ground telecommunications unit 64 send a handoff release signal to the switch control processor 60 indicating the completion of a conservation handoff. Steps 244–252 describe the resumption of normal call service following a conservation handoff. Although the new traffic service channel may be on the same radio base station 36 with the same ground baseband processor 62 it may also be on a new radio base station 36. Thus, for the sake of clarity the ground baseband processor 62 carrying the old traffic service channel will be called the old ground baseband processor 62 and the ground baseband processor 62 carrying the new traffic service channel will be called the new ground baseband processor 62, even though in some cases they are the same.

Call handoff in a seizure-type scenario (seizure handoff), as illustrated in FIGS. 16–20 switches voice/data calls from an old traffic service channel(the one currently in use) to a new traffic service channel (the destination). One can assume the protocol and handshake between different components is the same as under a conservation handoff where similar actions are performed.

Figure 16:
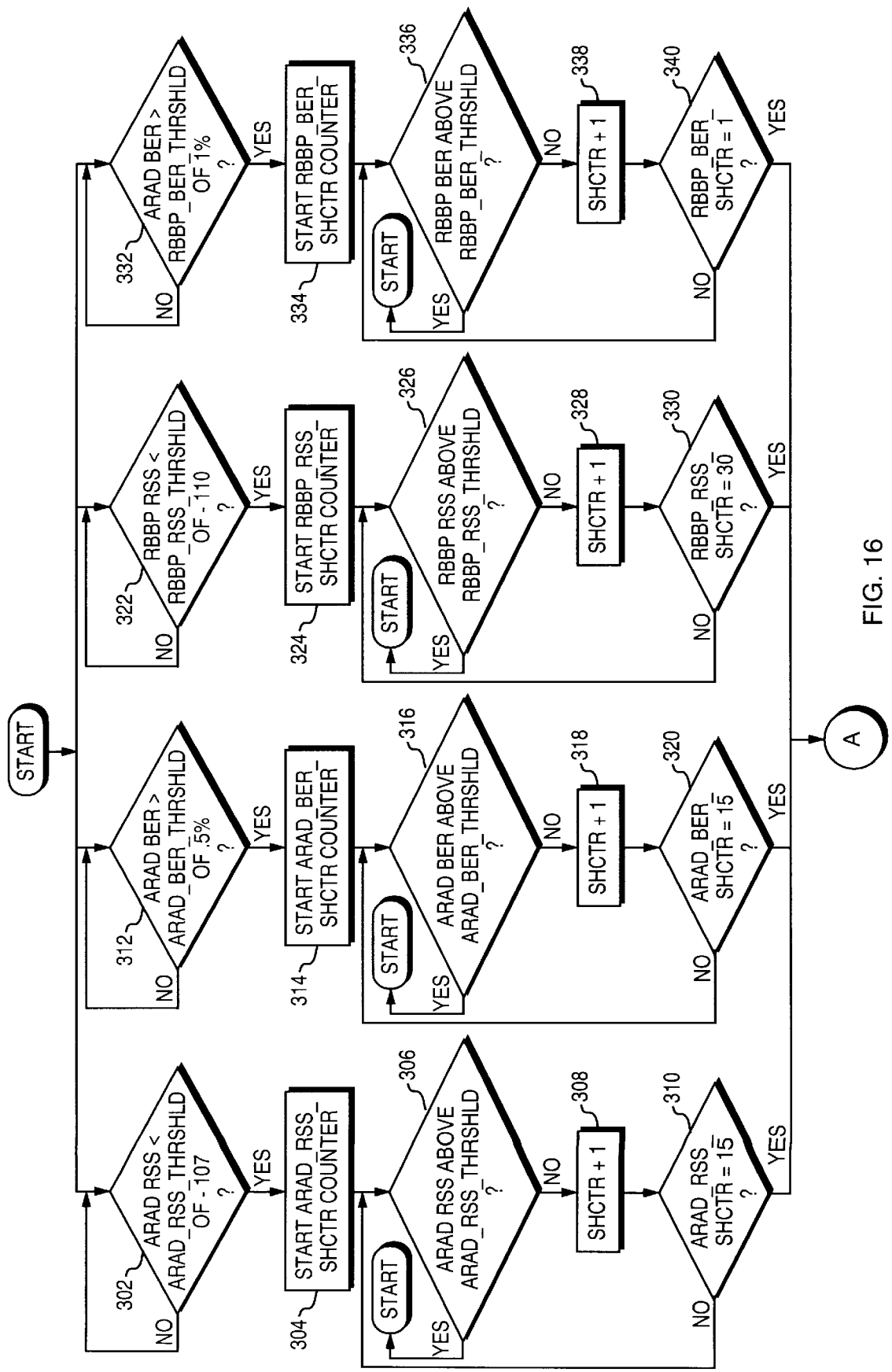
FIGS. 16–20 is a flowchart representing the steps taken in a seizure call handoff.

In FIG. 16, steps 300–340 illustrate the various transmission signal characteristics examined by one embodiment of the present invention. In steps 302–310 the aircraft radio unit 48 monitors the aircraft radio unit 48 received signal strength to determine whether it has fallen below a threshold of −107 dBm (decibels above a milliwatt) for 15 seconds. In steps 312–320 the aircraft radio unit 48 monitors the aircraft radio unit 48 bit error rate to determine if the rate has risen above 0.5% for 15 seconds. In steps 322–330 the aircraft radio unit 48 monitors the ground radio 58 receive signal strength to determine if it has fallen below a threshold of −110 dBm for a 30 second period. In steps 332–340 the aircraft radio unit 48 monitors the ground radio baseband processor 62 to determine if the bit error rate has risen above 1%. If any of the above thresholds are exceeded for the duration specified, than a seizure handoff scenario exists and a seizure handoff is initiated in step 342 of FIG. 17.

Figure 17:
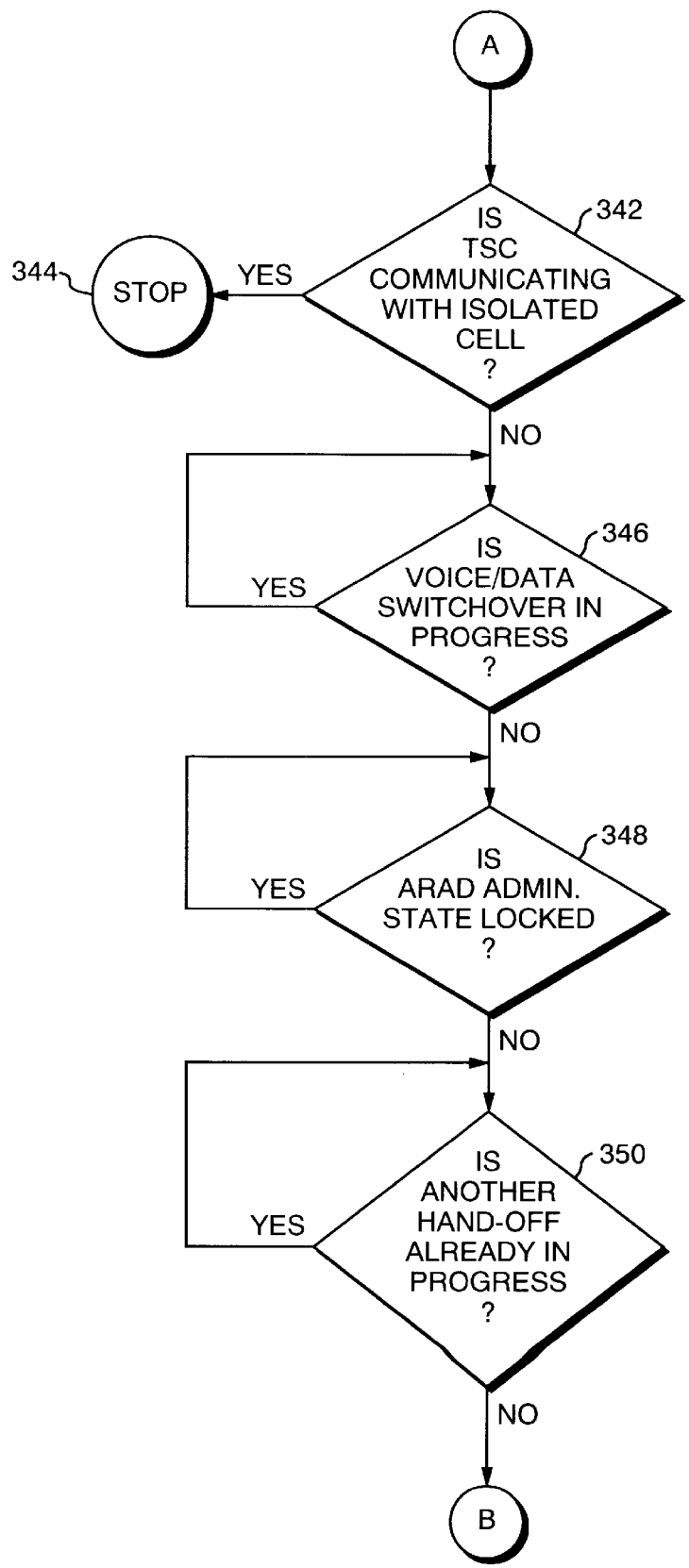

In FIG. 17, step 342, if the traffic service channel is communicating with an isolated cell then seizure call handoff is terminated in step 344, if not then proceed to step 346. In step 346 if a voice/data switchover, i.e. the user switching between voice and data, is already in progress then the system waits for completion, otherwise proceed to step 348. In step 348 if the aircraft radio unit 48 is in a locked administrative state then control will wait until that state is unlocked, otherwise proceed to step 350. In step 350 if another handoff is already in progress then again the system will wait until that handoff is completed, otherwise proceed to FIG. 18 step 352.

Figure 18:
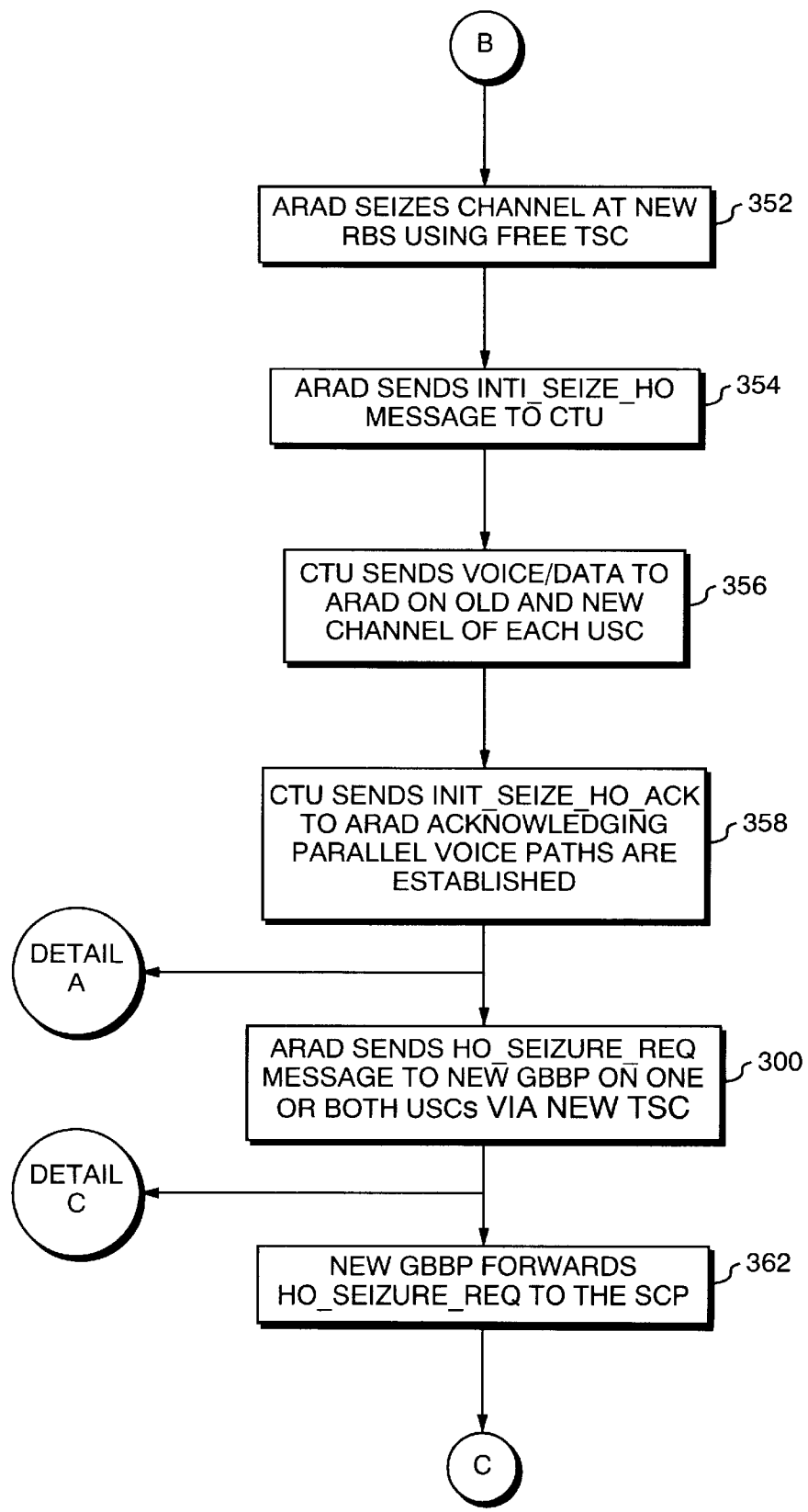

In FIG. 18, step 352, the aircraft radio unit 48 seizes the new traffic service channel and a corresponding new user service channels at a new radio base station 36 using aircraft phone system 46 hardware not presently in use. In step 354 the aircraft radio unit 48 sends an initiate seizure handoff signal (INIT_SEIZE_HO) to the cabin telecommunications unit 44. In step 356 the cabin telecommunications unit 44 sends voice/data from the call or calls on both the old and new user service channels. In step 358 the cabin telecommunications unit 44 sends an acknowledgement signal (INIT_SEIZE_HO_ACK) to the aircraft radio unit 48 acknowledging parallel voice paths have been established on the old and new user service channels. In step 360 the aircraft radio unit 48 sends a handoff seizure request signal (HO_SEIZURE_REQ) to the new ground baseband processor 62 on one or both user service channels via the new traffic service channel. Detail on step 360 is the same as in the conservation handoff in section "A". In step 362 the new ground baseband processor 62 forwards the HO_SEIZURE_REQ signal to the switch control processor 60. Detail on step 362 is the same as in the conservation handoff in section "C".

Figure 19:
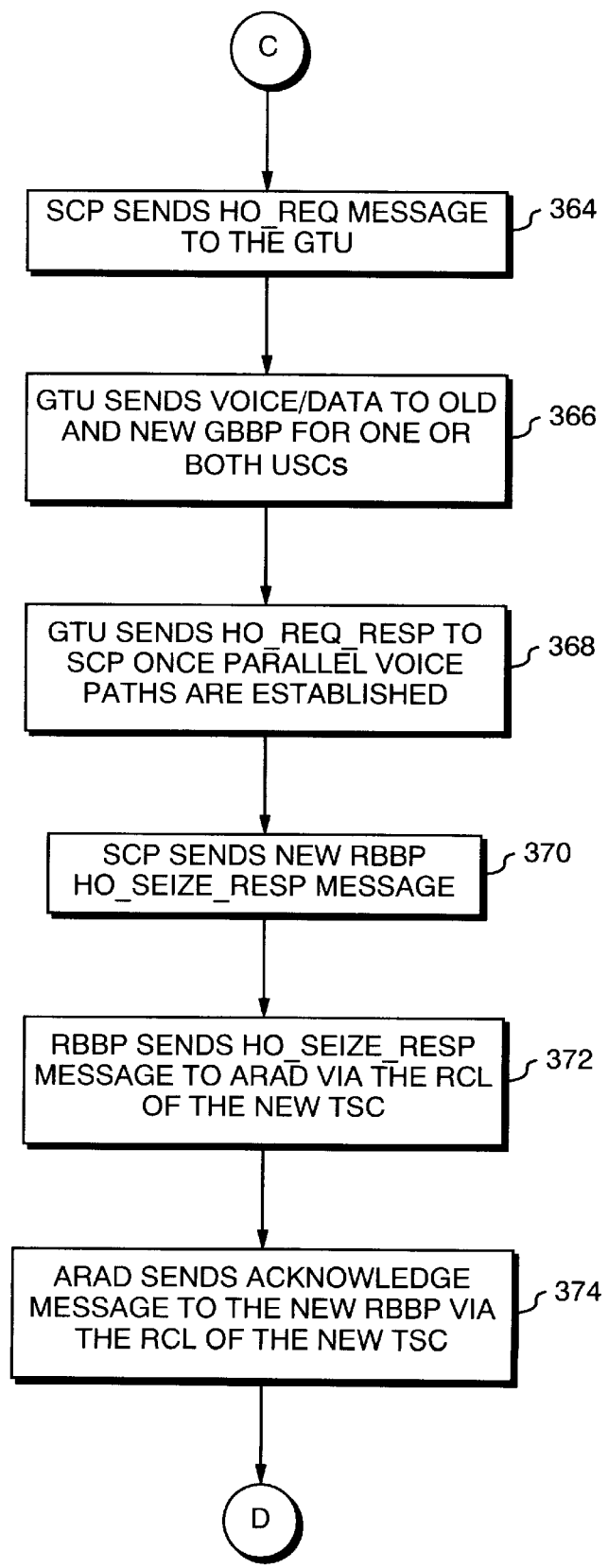

In FIG. 19, step 364, the switch control processor 60 sends the handoff request signal (HO_REQ) to the ground telecommunications unit 64. In step 366 the ground telecommunications unit 64 sends the voice/data to the old and new ground baseband processors 62 for the user service channels with user traffic. In step 368 the ground telecommunications unit 64 sends the handoff request response (HO_REQ_RESP) to the switch control processor 60 once parallel voice paths have been established. In step 370 the switch control processor 60 sends the new radio baseband processor the HO_SEIZE_RESP message. In step 372 the radio baseband processor sends the HO_SEIZE_RESP message to the aircraft radio unit 48 via the radio control link of the new traffic service channel 22. In step 374, the aircraft radio unit 48 acknowledges the message to the new radio baseband processor via the radio control link.

Figure 20:
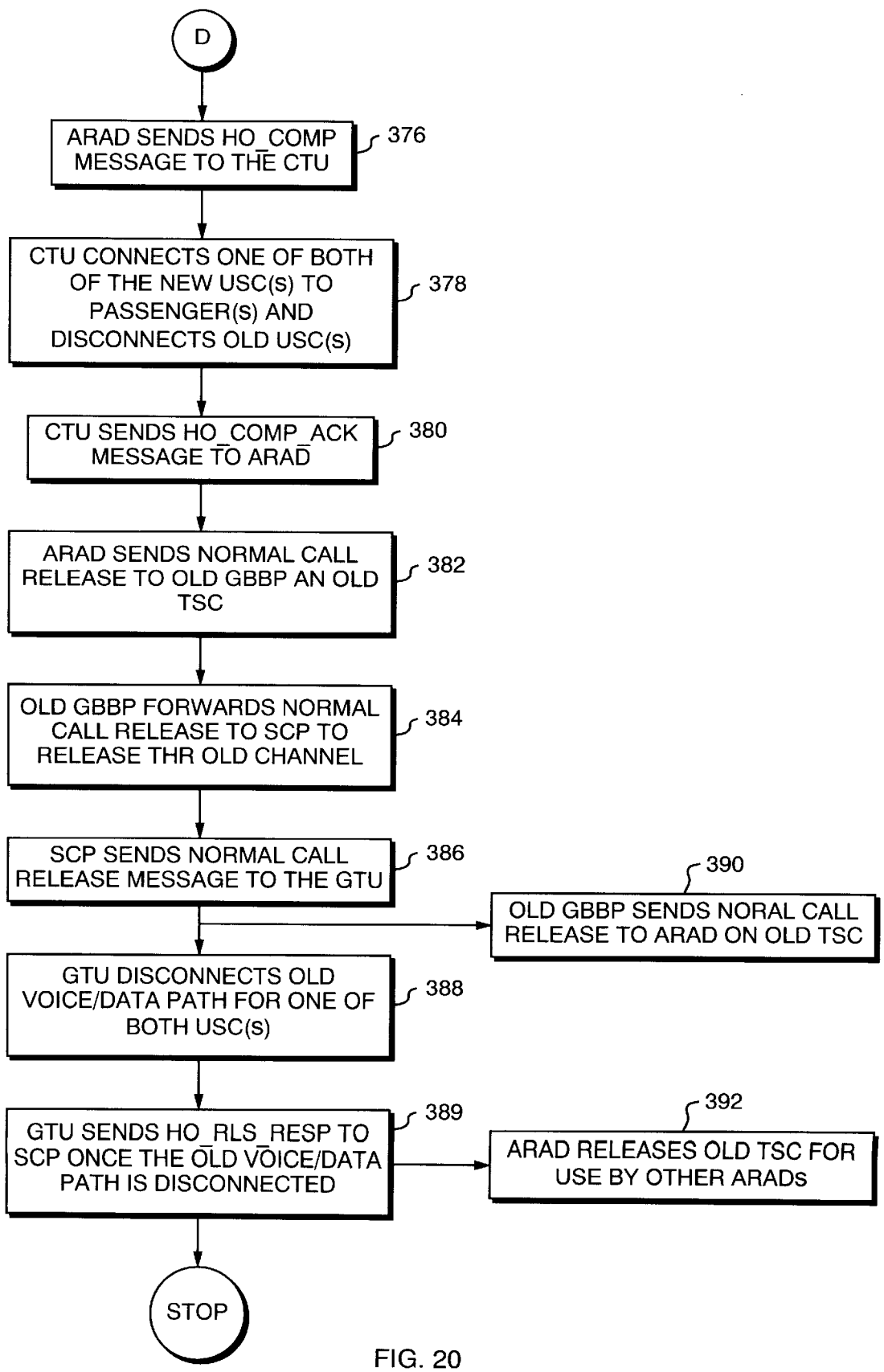

In FIG. 20, step 376, the aircraft radio unit 48 sends a handoff complete signal (HO_COMP) to the cabin telecommunications unit 44. In step 378 the cabin telecommunications unit 44 connects the new user service channel(s) to the callers and disconnects the old user service channel(s). In step 380 the cabin telecommunications unit 44 sends the handoff complete acknowledgement signal (HO_COMP_ACK) to the aircraft radio unit 48. In step 382 the aircraft radio unit 48 sends a normal call release signal to the old ground baseband processor 62 on the old traffic service channel. In step 384 the old ground baseband processor 62 forwards the normal call release to the switch control processor 60 to release the old traffic service channel. In step 386 the switch control processor 60 sends the normal call release message to the ground telecommunications unit 64. Step 388 occurs in parallel with step 390. In step 388 the ground telecommunications unit 64 disconnects old voice/data path for one or both user service channels on the old traffic service channel. In step 390 the old ground baseband processor 62 send a normal call release to the aircraft radio unit 48 on the old traffic service channel. In step 392 the aircraft radio unit 48 releases the old traffic service channel for use by other aircraft 32. Finally, in step 394 the ground telecommunications unit 64 sends a handoff release response signal (HO_RLS_RESP) to the switch control processor 60 once the old voice/data path(s) are disconnected. Handoff is complete and back to step 344.

Call handoff in a seizure-type scenario is similar to call handoff in a reservation type scenario (reservation handoff). The key distinction is that there are no free traffic service channels 22 available on the aircraft radio unit 52 to switch to. Thus a reservation handoff must close both old (currently being used) traffic service channels 22 and bring up the voice/data calls on two new (switched to) traffic service channels 22 in one embodiment of the present invention. Reservation handoff is illustrated in FIGS. 21–26. One can assume the protocol and handshake between different components is the same as under a conservation handoff, seizure handoff and a reservation handoff where similar actions are performed. Thus, the "old" and "new" designations are used as described above with regard to seizure handoff.

Figure 21:
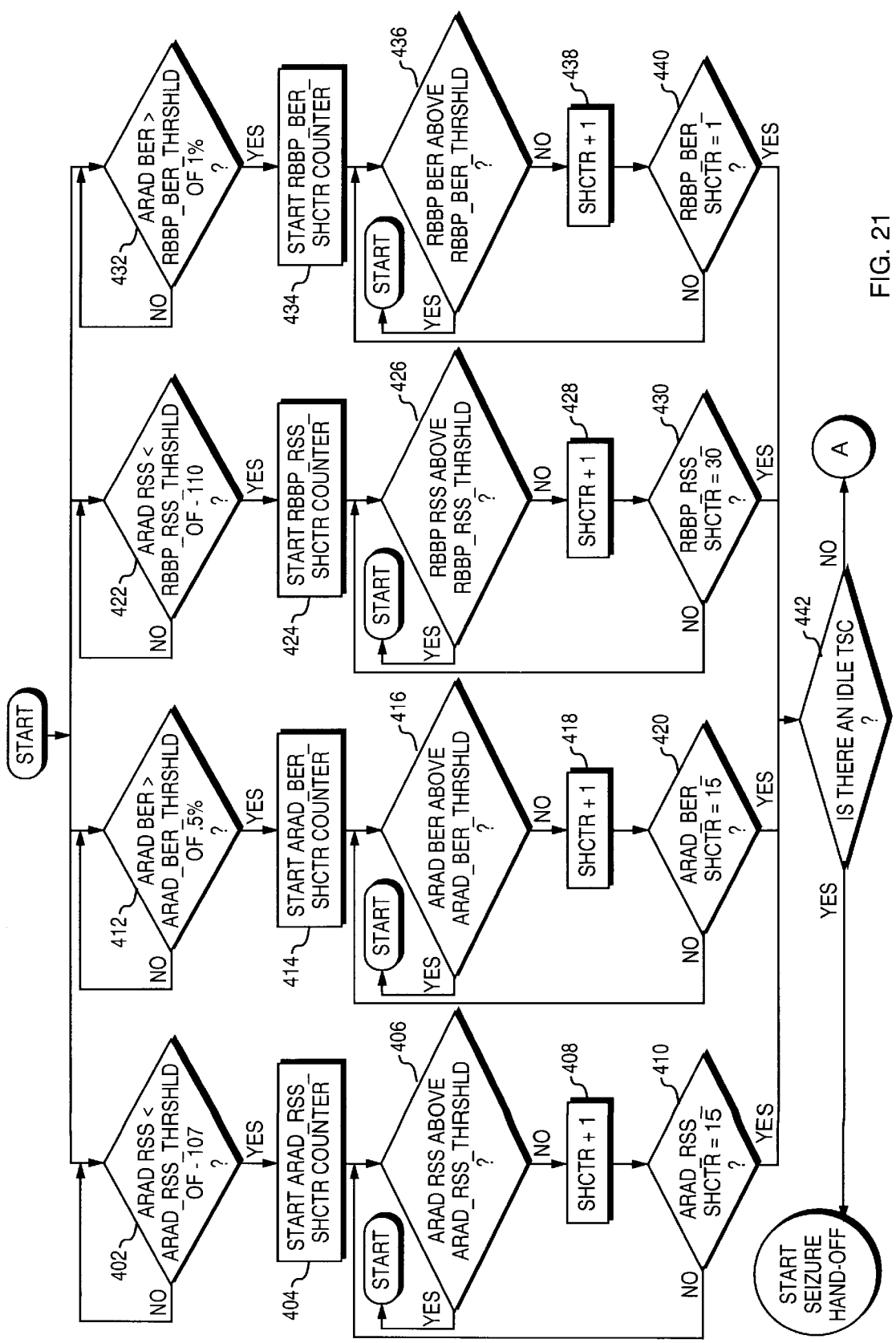

In FIG. 21, steps 400–440 illustrate the various transmission signal characteristics examined by one embodiment of the present invention in a call reservation scenario. In steps 402–410 the aircraft radio unit 48 monitors the aircraft radio unit 48 received signal strength to determine whether it has fallen below a threshold of –107 dBm for 15 seconds. In steps 412–420 the aircraft radio unit 48 monitors the aircraft radio unit 48 bit error rate to determine if the rate has risen above 0.5 % for 15 seconds. In steps 422–430 the aircraft radio unit 48 monitors the ground radio baseband processor 62 receive signal strength to determine if it has fallen below a threshold of –110 dBm for a 30 second monitoring period. In steps 432–440 the aircraft radio unit 48 monitors the ground radio baseband processor 62 to determine if the bit error rate has risen above 1%. If any of the above thresholds are exceeded for the duration specified, and in step 442 there are no idle traffic service channels 22, then a reservation handoff scenario exists and a reservation handoff is initiated in step 444 of FIG. 22, otherwise a seizure handoff scenario exists.

Figure 22:
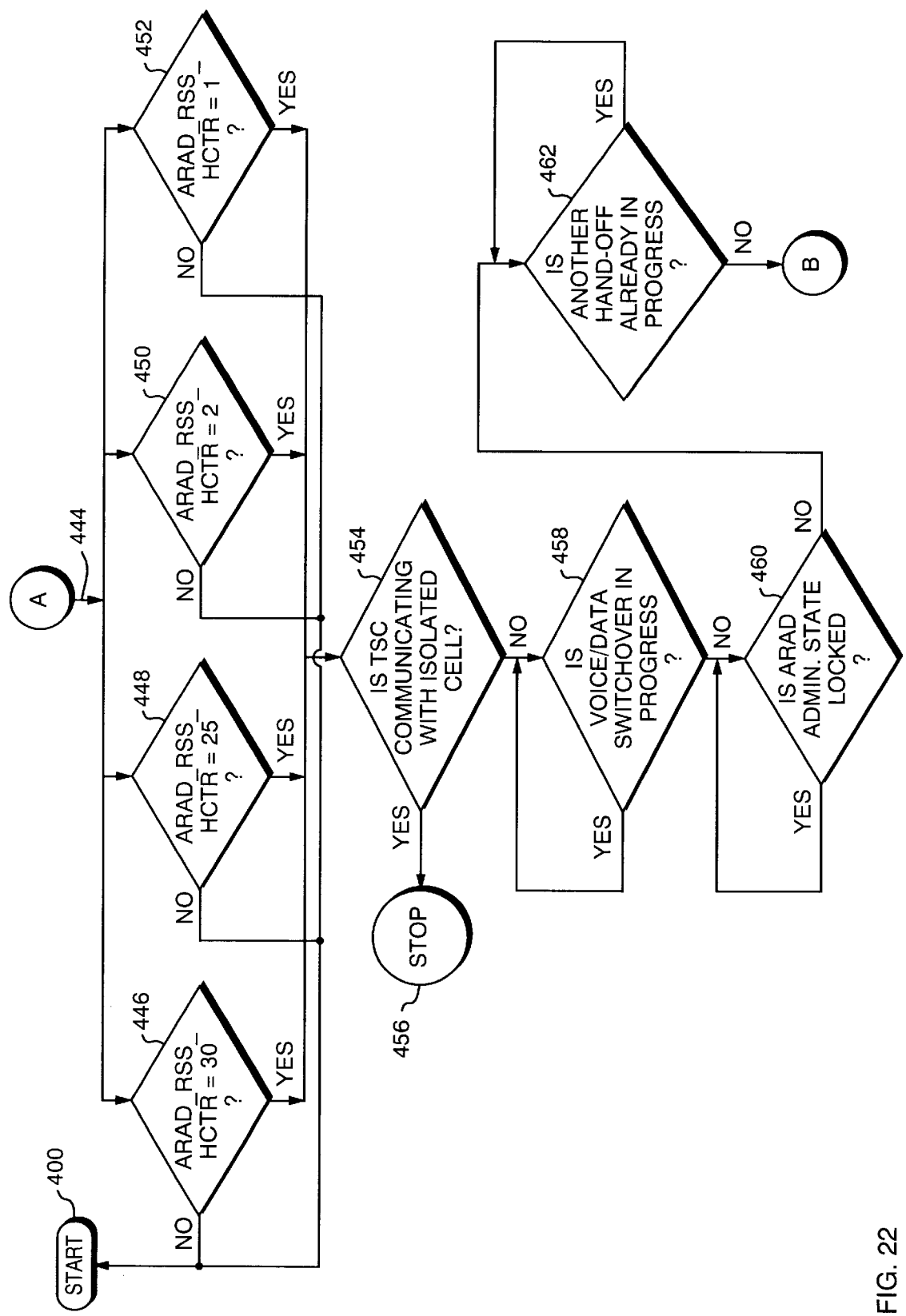

In FIG. 22, steps 446–452 symbolically represent the increased amount of time the thresholds of steps 402, 412, 422, 432, respectively, must be exceeded for the system to initiate a reservation handoff. The amount of time is increased because service to the existing calls in a reservation handoff is interrupted, albeit for less than 2 seconds. If the traffic service channel is communicating with an isolated cell in step 454, then reservation call handoff is terminated in step 456, if not then proceed to step 458. In step 458 if a voice/data switchover, i.e. user switching between voice and data, is already in progress then the system waits for completion, otherwise proceed to step 460. In step 460 if the aircraft radio unit 48 is a locked administrative state then control will wait until that state is unlocked, otherwise proceed to step 462. In step 462 if another handoff is already in progress then again the system will wait until that handoff is completed, otherwise proceed to FIG. 23, step 464.

Figure 23:
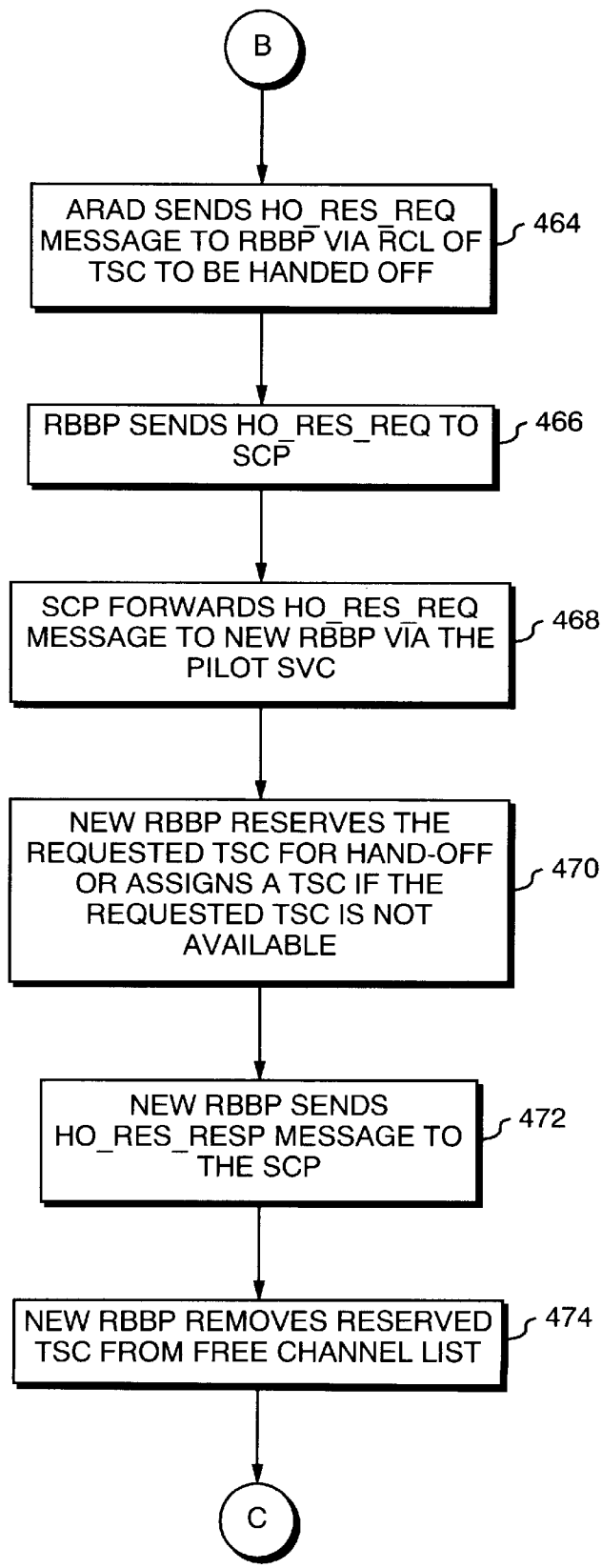

In FIG. 23, step 464, the aircraft radio unit 48 transmits a reservation handoff request (HO_RES_REQ) to the old radio baseband processor via the radio control link of the traffic service channel to be handed off. In step 466 the old radio base station 36 sends the HO_RES_REQ signal to the switch control processor 60 via the ground radio baseband processor 62. In step 468 the switch control processor 60 forwards the HO_RES_REQ signal to the new ground radio baseband processor via the pilot channel 20. In step 470 the new ground radio baseband processor reserves the requested traffic service channel for the reservation handoff or assigns a traffic service channel if the requested traffic service channel is not available. The aircraft radio unit 48 will try to select the most optimal traffic service channel it determines is available based on the signal characteristics examined above. In step 472 the new radio baseband processor sends the reservation handoff response message (HO_RES_RESP) to the switch control processor 60. In step 474 the new radio baseband processor removes the reserved traffic service channel from the free channel list.

Figure 24:
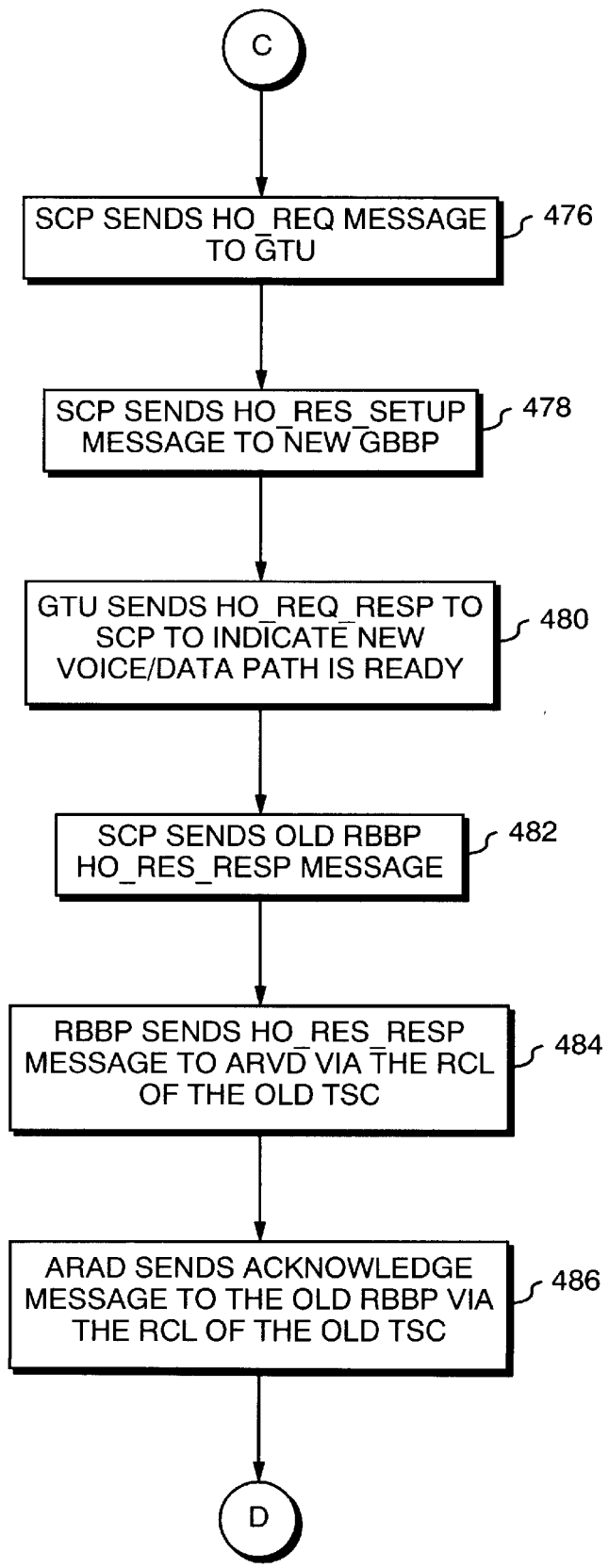

In FIG. 24, step 476, the switch control processor 60 sends the handoff request signal (HO_REQ) to the ground telecommunications unit 64. In step 478 the switch control processor 60 sends a reservation handoff setup message (HO_RES_SETUP) to the new ground baseband processor 62. In step 480 the ground telecommunications unit 64 sends the handoff request response signal (HO_REQ_RESP) to the switch control processor 60 to indicate that the new traffic service channel and associated user service channels are ready for calls. In step 482 the switch control processor 60 sends the old radio baseband processor the HO_REQ_RESP signal. In step 484 the old radio baseband processor sends the handoff request response signal (HO_REQ_RESP) to the aircraft radio unit 48 via the radio control link of the old traffic service channel. In step 486 the aircraft radio unit 48 send an acknowledge message to the old radio baseband processor via the radio control link of the old traffic service channel.

Figure 25:
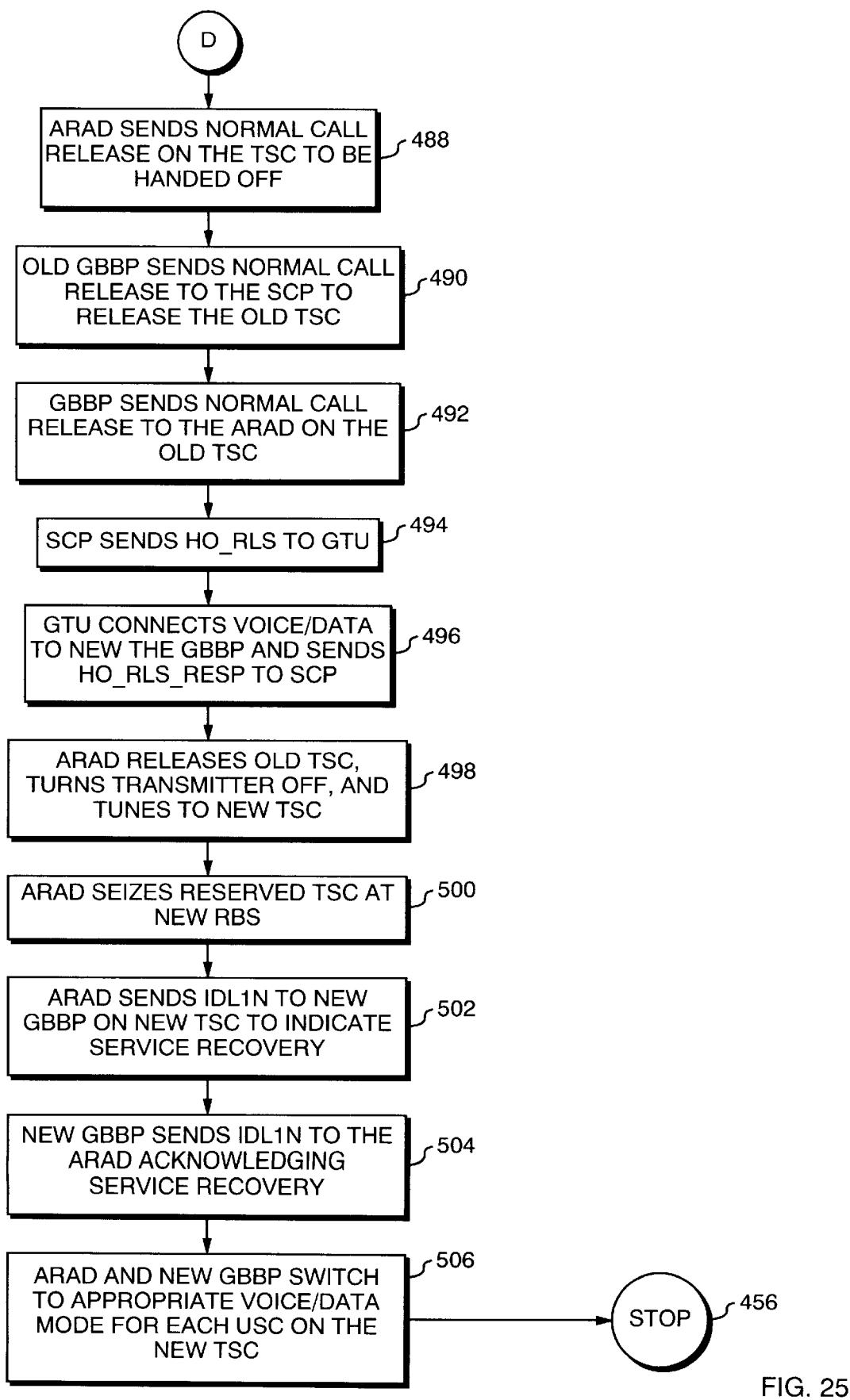

In FIG. 25, step 488, the aircraft radio unit 48 sends a normal call release on the old traffic service channel to be handed off. In step 490 the old ground baseband processor 62 sends a normal call release to the switch control processor 60 to release the old traffic service channel. In step 492 the ground baseband processor 62 sends a normal call release to the aircraft radio unit 48 on the old traffic service channel. In step 494 the switch control processor 60 sends the handoff release (HO_RLS) signal to the ground telecommunications unit 64. In step 496 the ground telecommunications unit 64 connected the existing calls' voice/data/etc. to the new ground baseband processor and sends the handoff release response signal (HO_RLS_RESP) to the switch control processor 60. In step 498 the aircraft radio unit 48 releases the old traffic service channel, turns the transmitter off and tunes to the new traffic service channel. In step 500 the aircraft radio unit 48 seizes the reserved traffic service channel at the new radio base station 36. Next, in step 502, the aircraft radio unit 48 sends the IDL1N gold code to the new ground baseband processor on the new traffic service channel to indicate service recovery for the handed off calls. In step 504 the new ground baseband processor sends IDL1N gold code to the aircraft radio unit 48, thereby acknowledging service recovery. In step 506 the aircraft radio unit 48 and the new ground baseband processor switch to appropriate voice/data mode for each user service channel on the new traffic service channels 22. The handoff then stops in step 456. Thus the reservation handoff process is completed and the system returns to checking for the poor signal characteristics specified above.

Figure 26A:
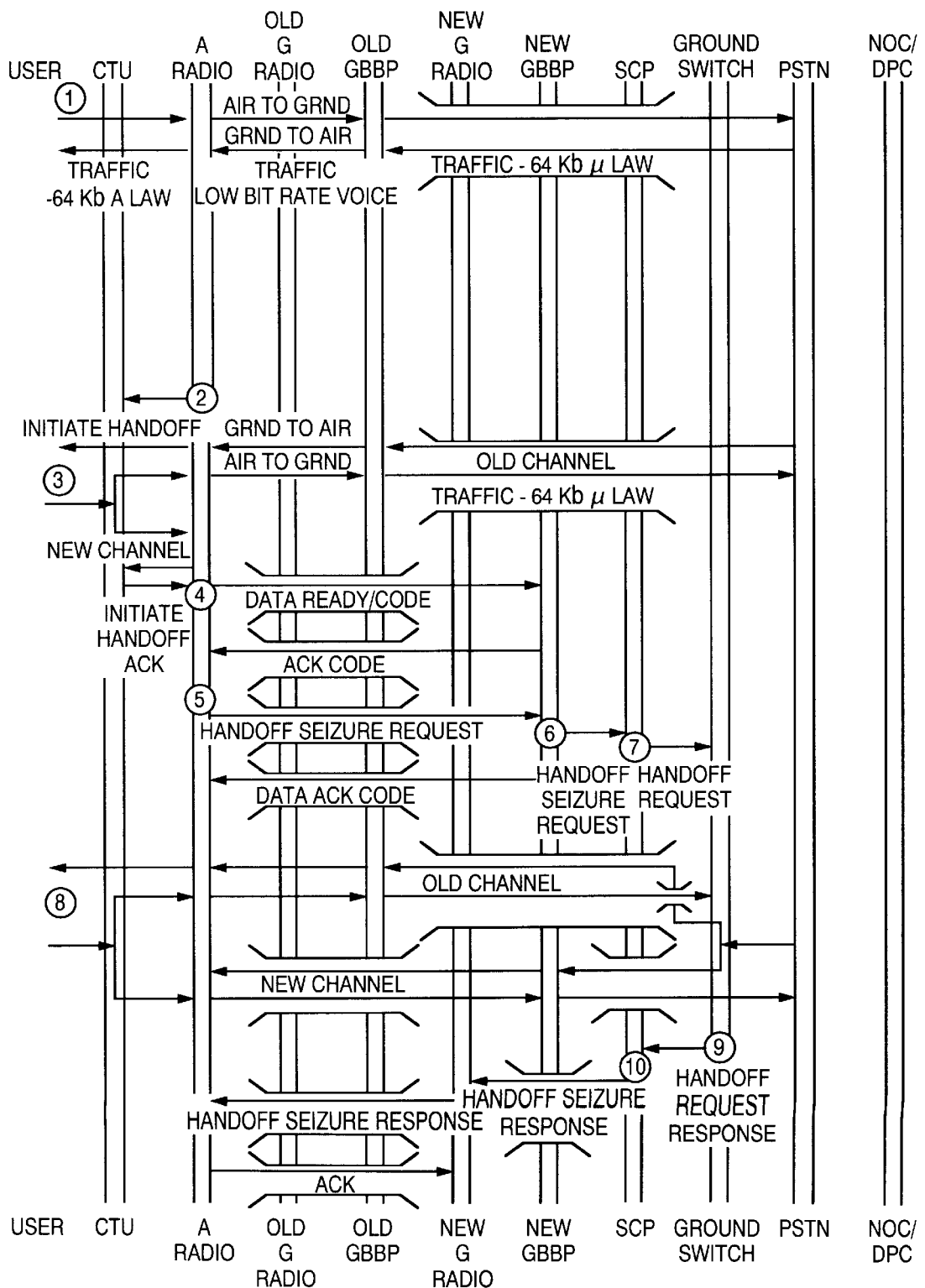
FIGS. 26A–26C are a representation of equipment passing signals over time to perform a conservation call handoff.
Figure 26B:
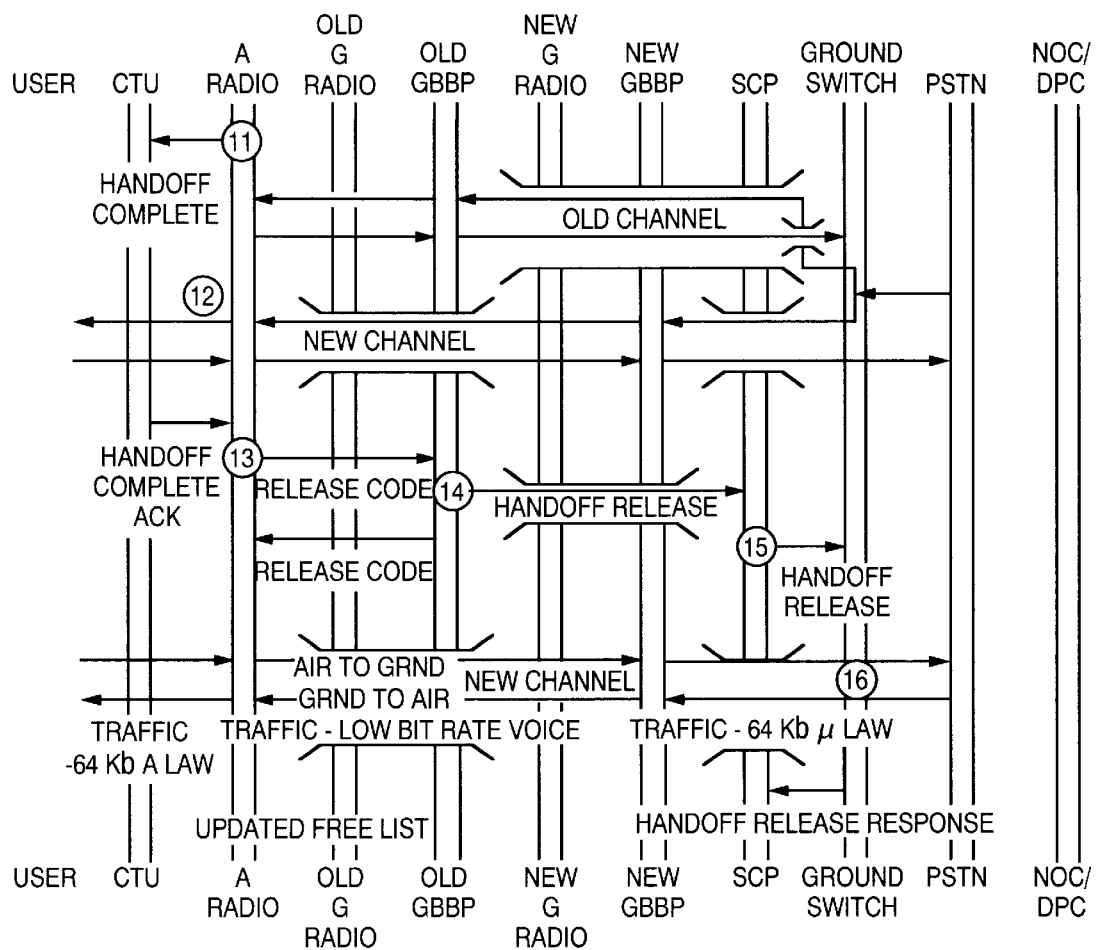
Figure 26C:
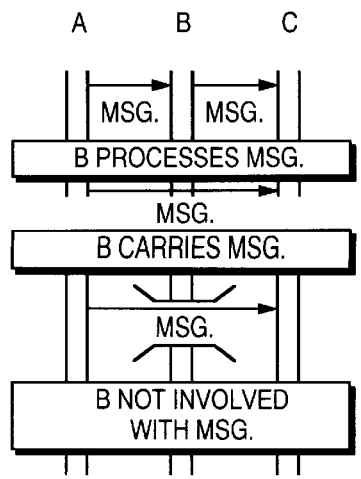
Figure 27A:
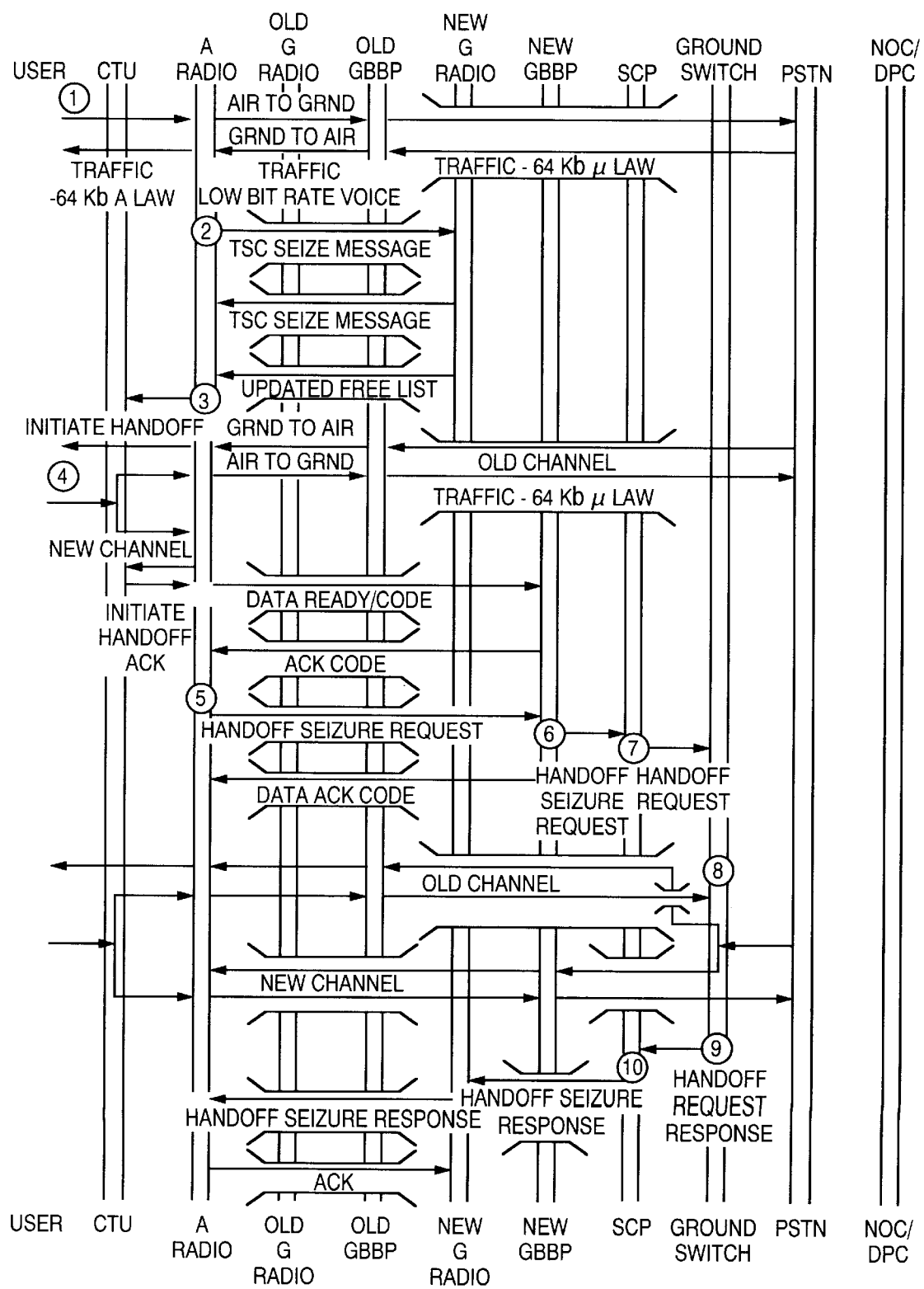
FIGS. 27A–27C are a representation of equipment passing signals over time to perform a conservation call handoff.
Figure 27B:
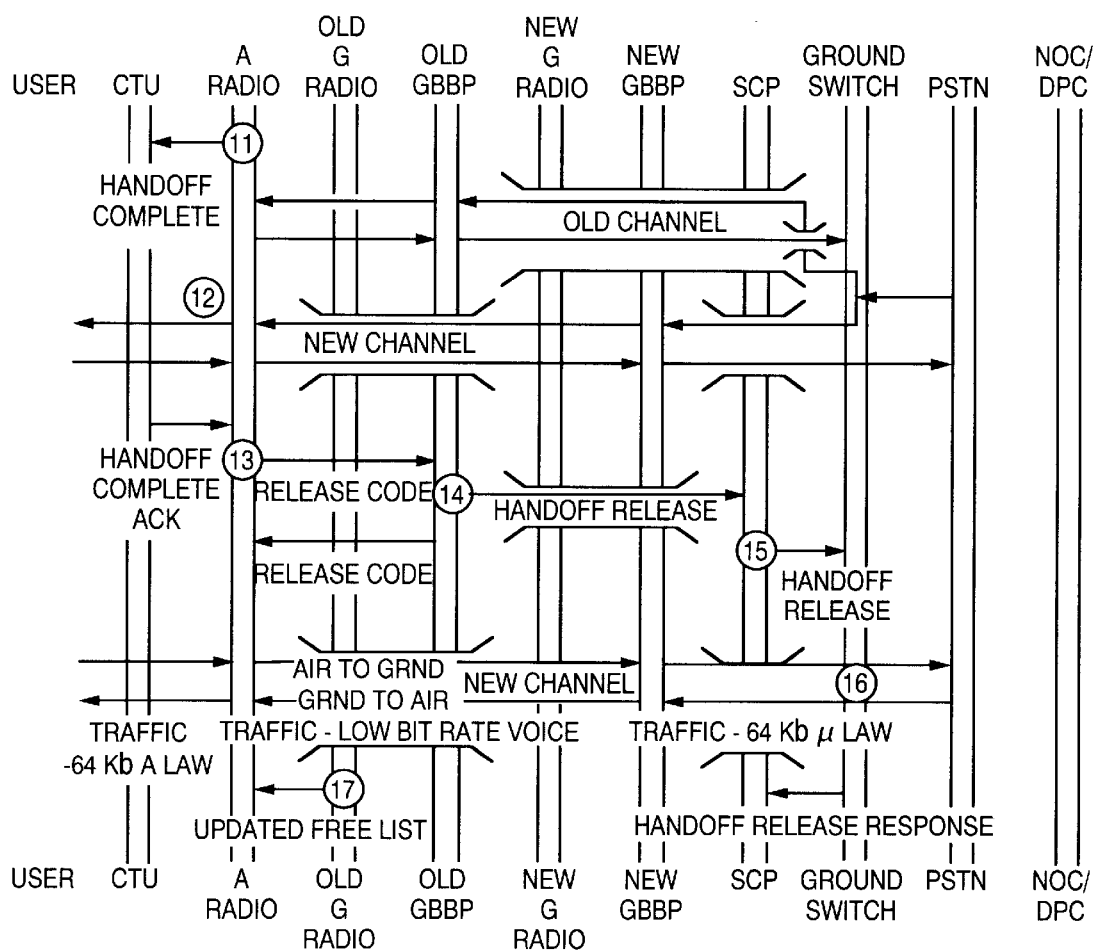
Figure 27C:
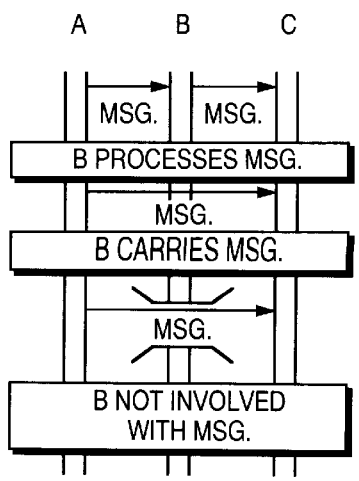
Figure 28:
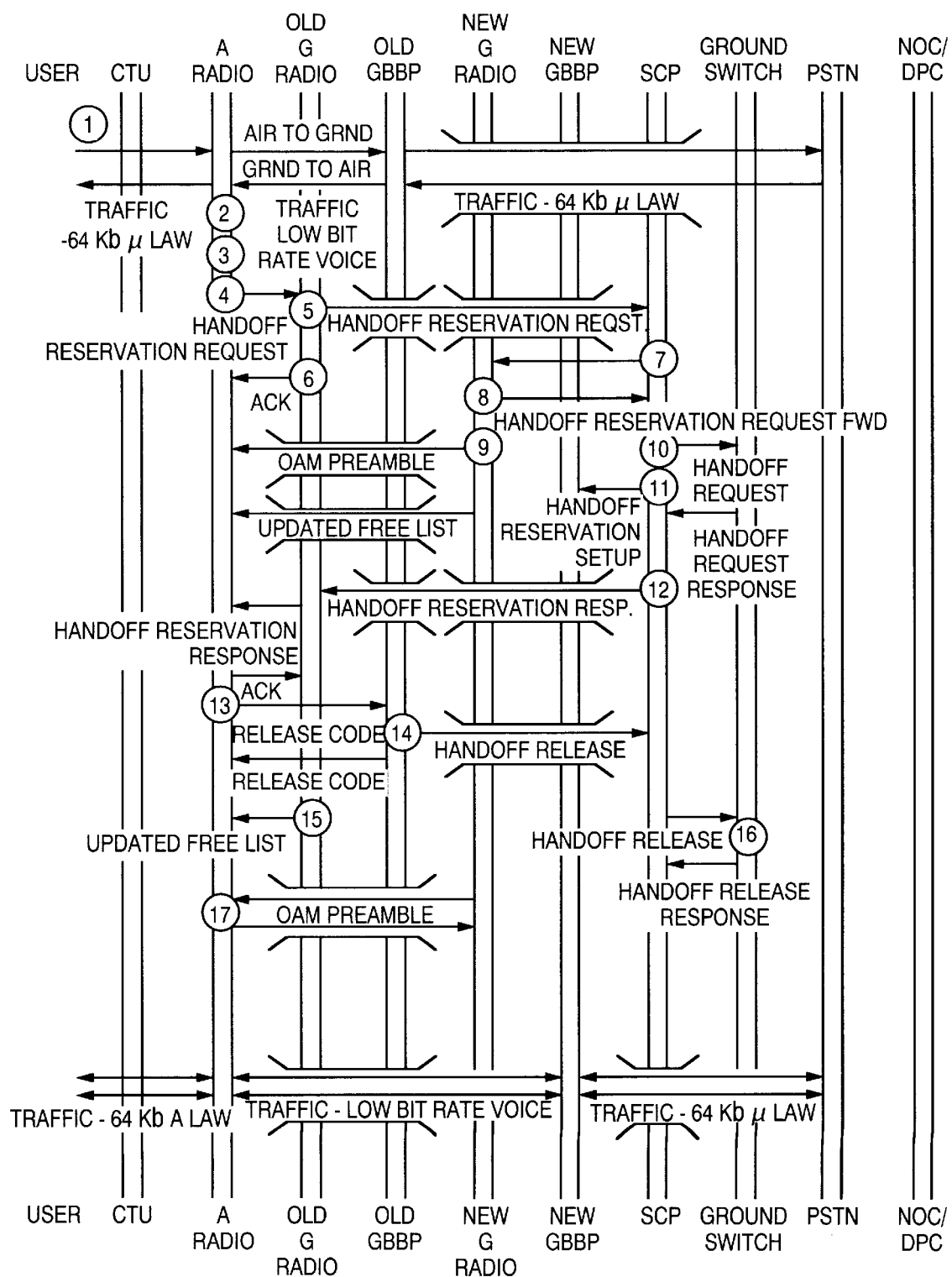
FIG. 28 is a representation of equipment passing signals over time to perform a conservation call handoff.

In FIGS. 26–28, all three types of call handoffs are illustrate from a signalling perspective between the various functional units of the communications system 30. Specifically, conservation handoff is illustrated in FIG. 26, seizure handoff is illustrated in FIG. 27, and reservation handoff is illustrated in FIG. 28.

Thus, there has been described herein an improved air/ground digital communications system 30.

Many modifications and variations of the invention as hereinbefore set forth can be made without departing from the spirit and scope thereof and therefore only such limitations should be imposed as are indicated by the appended claims.

What is claimed is:

1. A method of performing a call handoff of at least one user's call carried on a first traffic service channel, said user being located in an airplane, said user's call being transmitted between an aircraft phone system and a radio base station, said radio base station coupled to a public switched telephone network, comprising the steps of:

identifying, with said aircraft phone system, when a second traffic service channel's unused call capacity is not less than a capacity to carry said at least one user's call;

duplicating, with said aircraft phone system in response to the step of identifying, said at least one user's call onto said second traffic service channel to create a duplicate call over said second traffic service channel;

transferring, with said aircraft phone system, the at least one user's call from said first traffic service channel to said second traffic service channel using the duplicated call; and releasing, with said aircraft phone system, said first traffic service channel.

\* \* \* \* \*